US009327600B1

(12) United States Patent
Nehmeh

(10) Patent No.: US 9,327,600 B1
(45) Date of Patent: May 3, 2016

(54) AIRCRAFT UTILITIES AND POWER DISTRIBUTION SYSTEM

(75) Inventor: Jody N. Nehmeh, Glendale, AZ (US)

(73) Assignee: Neeme Systems Solutions, Inc., Glendale, AZ (US)

( * ) Notice: Subject to any disclaimer, the term of this patent is extended or adjusted under 35 U.S.C. 154(b) by 697 days.

(21) Appl. No.: 13/605,128

(22) Filed: Sep. 6, 2012

Related U.S. Application Data

(60) Provisional application No. 61/531,486, filed on Sep. 6, 2011.

(51) Int. Cl.
*B60L 1/00* (2006.01)
*B60L 3/00* (2006.01)
*H02G 3/00* (2006.01)

(52) U.S. Cl.
CPC .... *B60L 1/00* (2013.01); *B60L 3/00* (2013.01); *H02G 3/00* (2013.01)

(58) Field of Classification Search
CPC ............. B60K 1/04; B60K 2001/0472; B60K 2001/0438; Y02T 90/124
USPC .......................................................... 307/9.1
See application file for complete search history.

(56) References Cited

U.S. PATENT DOCUMENTS

| | | | | |
|---|---|---|---|---|
| 6,344,700 | B1 * | 2/2002 | Eisenhauer et al. | 307/64 |
| 6,856,045 | B1 * | 2/2005 | Beneditz et al. | 307/43 |
| 7,116,003 | B2 * | 10/2006 | Hoppe | 290/1 A |
| 7,439,634 | B2 * | 10/2008 | Michalko | 307/43 |
| 7,737,577 | B2 * | 6/2010 | Langlois et al. | 307/19 |
| 7,876,542 | B2 * | 1/2011 | Rozman et al. | 361/87 |
| 7,922,117 | B2 * | 4/2011 | Wavering et al. | 244/58 |

* cited by examiner

*Primary Examiner* — Jared Fureman
*Assistant Examiner* — Esayas Yeshaw
(74) *Attorney, Agent, or Firm* — Paul B. Heynssens Attorney at Law, PLC

(57) ABSTRACT

The present example provides aircraft integrated aircraft utility management and power distribution systems. Included are three exemplary implementations of aircraft power management systems (a DC power distribution system, a utility management system, and a combined system) that may utilize the like architecture, technologies, and components advantageously. A DC power distribution system can include two parts: primary DC power distribution and secondary DC power distribution systems. The utility management system integrates aircraft sub functions and utilities into one fault tolerant system. The systems described makes use of secondary power distribution units of a modularized design, including standard I/O modules, power modules, and aircraft computing modules.

21 Claims, 19 Drawing Sheets

Twin Generator, 4 SPDU Configuration
700

Typical Aircraft Primary and Secondary DC Power Distribution System
100 aircraft single generator DC electrical
power distribution system
200

The Single Generator Power and Control System 200

Twin Generator, One Battery, and RAT PDS
500

Twin Generator, Two Battery, and RAT PDS
600

Twin Generator, 4 SPDU Configuration
700

High Availability Two Generator System
800

High Availability Two Generator System Diagram-Control
System Detail
800

Components interconnect within the SPDU

ACM Block Diagram and the Inter ACM communications System

Power supply System for the IOM and the PMs

Simplified Control Example

Exemplary Electrical System Control Panel

Six UPDU UMS Configuration

Landing Gear system UPDS Implementation

Flaps System UPDS Implementation

Engines and other Sensor Interfaces

AIRCRAFT UTILITIES AND POWER DISTRIBUTION SYSTEM

CROSS-REFERENCE TO RELATED APPLICATION

This application claims the benefit of U.S. Provisional Patent Application No. 61/531,486 filed Sep. 6, 2011, the contents of which are hereby incorporated by reference.

TECHNICAL FIELD

This description relates generally to avionics and more specifically to aircraft electrical and utility management systems.

BACKGROUND

Aircraft power systems generate, regulate and distribute power throughout an aircraft. Aircraft power differs from ground based utility systems in a number of ways; two of the most obvious are DC and AC power. In an aircraft the DC power is based on 28 V DC rather than the 12 VDC power in an auto, or other ground based vehicles. For AC power the frequency of operation is 400 Hz as opposed to 60 Hz in ground based utility systems. An important difference is also in reliability. If power goes out in your home the consequences are rarely catastrophic. If power goes out in an aircraft in flight the consequences can be disastrous. This is especially trues since the electronics content in aircraft has been increasing, and even the control surfaces may be actuated by electronics in so called fly by wire systems.

The need for reliability tends to call for power systems that are immune to generator failure and other failures that would cause a loss of aircraft power.

Aircraft power systems can include auxiliary power units that provide power when main engines are not running and complete electrical power generation and conversion systems that provide essential power for aircraft operation. Unlike a ground based public utility user the aircraft system is self-contained as the generating system, distribution system as well as the loads are present on the airframe.

In normal aircraft operation, the propulsion engines drive the generators to produce electric power. In case of total engine failure the aircraft would have a total loss of engine power and generator output. The use of emergency power systems can enable critical aircraft systems to continue operating until the aircraft is safely landed. Accordingly safe and reliable power distribution systems for aircraft may be desirable.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a novel configuration of an aircraft integrated aircraft utility management and power distribution system. Included are three exemplary implementations of aircraft power management systems (a DC power distribution system, a utility management system, and a combined implementation) that may utilize the like architecture, technologies, and components advantageously.

A first implementation includes, a DC power distribution system ("PDS") platform. The power distribution system can include two parts: primary DC power distribution and secondary DC power distribution systems, or subsystems.

A second implementation may include a utility management system ("UMS") platform. The utility management system integrates aircraft sub functions and utilities into one fault tolerant system.

A third implementation can be a combined implementation that may combine the DC electrical power distribution system with the utility management system functions to provide a more efficient solution with significant safety, performance and weight advantages over currently available systems.

The systems described makes use of unique secondary power distribution units consisting of a modularized design, in which standard I/O (input output), power modules, and aircraft computing modules, that may be added or removed as desired, and in any number desired.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
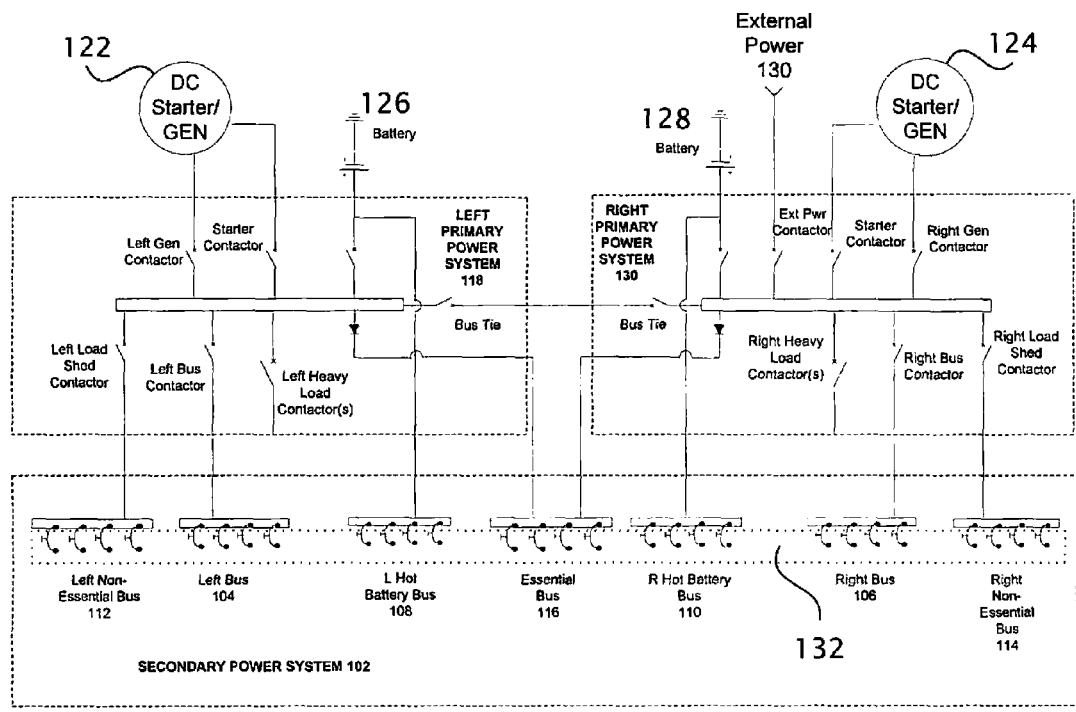
FIG. 1 is a block diagram of a typical primary and secondary electrical system for an exemplary twin engine aircraft.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an integrated utility management and power distribution system. Although the present examples are described and illustrated herein as being implemented in an aircraft system, the system described is provided as an example and not a limitation. As those skilled in the art will appreciate, the present examples are suitable for application in a variety of different types of power systems.

System Description

The examples of the present invention may be utilized in three exemplary implementations of aircraft power management systems (a DC power distribution system, a Utility Management System, and a combined implementation) that may utilize the like architecture, technologies, and components advantageously.

As used herein, UPDS refers to the integrated utilities and power distribution system, as opposed to a standalone power distribution system ("PDS"). The difference is that the PDS will only perform electrical power management and control while the UPDS will perform utility functions such as environmental and fuel control etc. in addition to electrical power distribution and management.

A first implementation includes, a DC power distribution system ("PDS") platform that satisfies high availability of power and provides advantages in weight safety and performance over that which is currently available. The power distribution system can include two parts: primary DC power distribution and secondary DC power distribution systems, or subsystems. Exemplary primary and secondary DC power distribution systems will be discussed herein at length in the following paragraphs.

A second implementation may include a utility management system ("UMS") platform that may provide significant advantages in weight safety and performance over that which is currently available. The utility management system integrates aircraft sub functions and utilities into one fault tolerant system. Aircraft utilities and their exemplary management will also be discussed at some length in this document.

A third implementation can be a combined implementation that may combine the DC electrical power distribution system with the utility management system functions to provide a more efficient solution with significant safety, performance and weight advantages over currently available systems.

The present invention is directed to general or business aircraft including helicopters. It may also be applied to vehicle or ship based systems. The system complements glass cockpit systems, by providing utilities, secondary flight controls, and power distribution functionality for aircraft, including the following aircraft types: Part 23 aircraft (Normal, Utility, Acrobatic and Commuter Airplanes); Part 25 business jets (Transport Category Airplanes); and Part 27 and part 29 helicopters (Normal and Transport Category Rotorcraft).

The exemplary DC power distribution systems described herein may include the following features and advantages over the systems currently available: unique primary and secondary architecture; flexible, scalable, and modular components; increased systems availability and integrity; improved performance; fault tolerance; improved fault isolation and maintenance capabilities; and reduced system size and weight.

Each of the aircraft DC power distribution systems described herein may include three subsystems: I) Primary Electrical Power Distribution; II) Secondary Electrical Power Distribution; and III) other aircraft subsystems, including onboard utilities and secondary flight controls. These three aircraft power distribution subsystems will first be described in the context of existing systems, and then described in the context of the unique approach described herein.

FIG. 1 is a block diagram of a typical primary 118, 120 and secondary 102 DC electrical system for an exemplary twin engine aircraft. Such electrical DC power distribution systems including single or multiple generators 122, 124 and batteries 126, 128 are designed to deliver power to multiple power busses in an aircraft. In such systems the aircraft may be powered by external power 130, while it is on the ground.

The power distribution system 100 consists of multiple power busses in a secondary power system 102. The buses include: left and right busses 104, 106, Load shed busses, battery busses 108, 110, non-essential busses 112, 114 and essential busses 116 to support the availability and integrity requirements for safe flight. Of note is the fact that the essential bus 116 is hard wired to multiple electrical sources (primary and secondary DC power) 118, 120, while other busses are only hard wired to one source, either the primary power source 118 or the secondary power source 120. Accordingly essential systems requiring DC power may be coupled to one of the DC power sources provided by either the primary, or secondary systems as needed or desired.

A limitation of this typical design is that when one bus 104, 106, 108, 110, 112, 114 is shorted or disconnected due to failures or faults, typically all electric loads coupled to that bus loose power too. This can be a significant limitation in aircraft and other similar power systems as may be demonstrated by considering an exemplary situation.

For example if the electrical bus that drives the flaps actuator is lost due to failures, the flaps become inoperable thus leading to increased pilot workload during final approach and landing. Increased pilot workload causes reductions in the safety margins. Loss of the electrical bus that drives the flaps actuator is not limited to only losing the flaps but also other subsystems as well which also effects pilot workload.

The conventional secondary electrical power distribution system 102 shown may utilize thermal (as shown) or equivalent electronic circuit breakers ("ECB") 132 for protection. Each aircraft circuit, or load, (not shown) that may be coupled to a bus 104, 108, 110, 112, 114 is coupled through a circuit breaker so that if the load coupled to it exceeds its rated current capacity the circuit is automatically removed from the bus to which it is coupled.

The circuit breakers are typically disposed for ease of access. The circuit breaker panel for thermal circuit breaker is typically a mechanical installation in the cockpit. A breaker panel for electronic circuit breakers is typically a virtual panel that is imbedded in the display system. The system of the present invention described herein is designed to interface to the virtual circuit breaker panel of modern glass cockpits.

The examples of aircraft utilities and power distribution systems described herein can provide significant advantages or the typical system described above. For example in addition to the primary and secondary systems described above the new aircraft utilities and power distribution system may include power management for other aircraft subsystems.

In addition to the primary and secondary power subsystems described above conventional aircraft and utility subsystems, such as environmental controls, may be implemented separate from the electrical power distribution system, or within the cockpit system hardware. If these subsystems are implemented separately, additional hardware is typically required to perform these functions. For example, a separate controller may be required to perform environmental control.

Exemplary aircraft utilities subsystems may include: primary electrical system control, monitoring and protection; secondary electrical system control, monitoring, and protection; data acquisition; lighting control and monitoring; fire protection system control and monitoring; ice/rain control, monitoring and protection; landing gear control and monitoring; fuel system quantity gauging, control, and monitoring; flaps system controls and monitoring; bleed air/environmental control and monitoring; oxygen system monitoring; engines secondary sensors data acquisition; FADEC interfaces brake system monitoring; general airframe monitoring (doors); CAS messaging for the utility functions; preflight testing of multiple aircraft subsystems; built in test ("BIT"), fault detection and isolation capabilities; and maintenance gateway.

The unique examples to be described herein integrate these utilities subsystems, and will be referred to as the utilities management system (or alternatively subsystem) ("UMS") in this document. This utilities management system can be implemented as a stand-alone system or integrated within the power distribution system. The utilities management system may employ a subset of the components of the power distribution system described herein. Both utility management system implementations (stand alone and integrated) can significantly reduce complexity and hardware, with an accompanying improvement in performance and safety.

The Exemplary Aircraft Utilities and Power Distribution Systems

Overview of Improvements Provided by the Exemplary Aircraft Utilities and Power Distribution Systems The unique electrical power distribution system and the utility management system combinations presented herein resolve many limitations of the currently available systems through unique primary and secondary systems architecture. The exemplary architecture improves performance through the utilization of electronic intelligence, automation, and redundancy. Operational cost may be reduced through weight reduction, fault tolerance implementation, modularity, maintenance reduction, reduced spares requirements and generally improved performance.

The system is modular and may utilize three primary types of modules that tend to provide flexibility in system design and maintenance, and as compared to what is currently available.

The exemplary power distribution system provides higher electrical power availability to all the electrical loads in the aircraft. This makes it desirable for fly by wire technology which can require higher electrical power availability, but without increasing parts count and weight.

The exemplary system incorporates processing power to perform control, monitoring, load shedding, load management, load balancing, built in test, fault isolation, and maintenance.

Instead of utilizing the conventional electrical bus structures (such as that presented in FIG. 1), the system of the present invention loads behaves as if the system consists of one single electrical power bus, but without the failure modes associated with the multiple bus structures.

A single point failure will not cause the loss of power to any load in the system. This essentially makes all loads in the aircraft satisfy the "essential" load operation of conventional systems. In the examples provided, the secondary power distribution system is designed such that no single point failure in the load drive electronics and protection mechanisms (the electronic circuit breaker associated with any electrical load) will compromise the operation of the load.

No single point failures in the electrical control system (processing) will cause loss of control or erroneous control of the electrical power distribution system and will not affect pilot workload which can compromise safety of flight.

The system architecture for power distribution system or utility management system is robust and includes two control paths: 1) the main control path is at least triple redundant, is fully automated and performs all the computations needed to perform power distribution system and utility management system control including power up preflight, phase of flight determination, and all the applications; and 2) a dissimilar manual back-up control path provides the crew with an alternate limited control bypass that allows for direct and manual access to the system without any dependency on the automated system.

Deferred Maintenance is possible due to the high degree of fault tolerance. Instead of having to replace a failed part, the crew can continue safe flights until the next periodic maintenance check of the aircraft. This can significantly reduce the operating cost of the aircraft.

Various Examples of Aircraft Utilities and Power Distribution Systems of a Unique Construction This section presents the following three alternative examples of electrical power distribution systems having a unique design to distribute primary electrical power: a) a unique single generator primary and secondary power distribution system; b) a unique two generator primary and secondary power distribution system; and c) a unique high availability two generator primary and secondary power distribution system.

a) The Single Generator Aircraft Utilities and Power Distribution System

Figure 2:
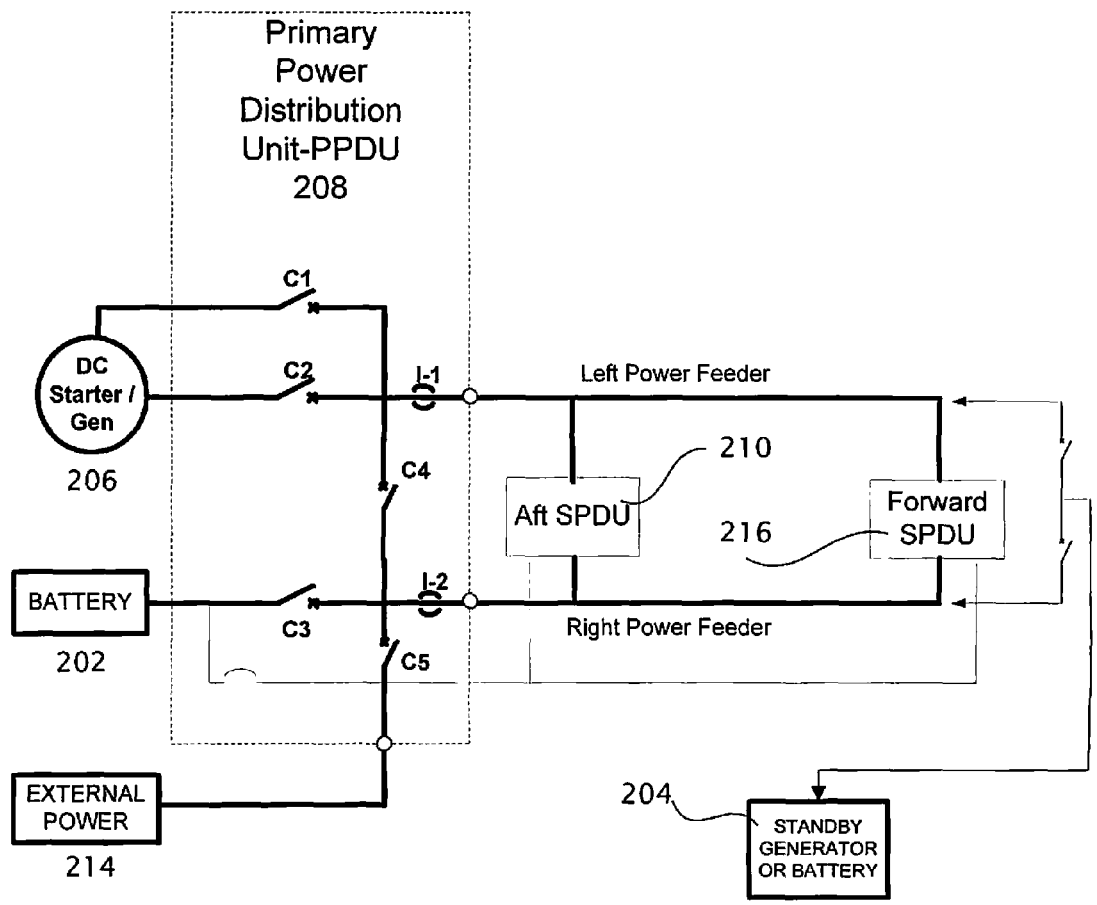
FIG. 2 is a block diagram of an example of single generator DC electrical power system diagram in accordance with the principle of the invention.
Figure 3:
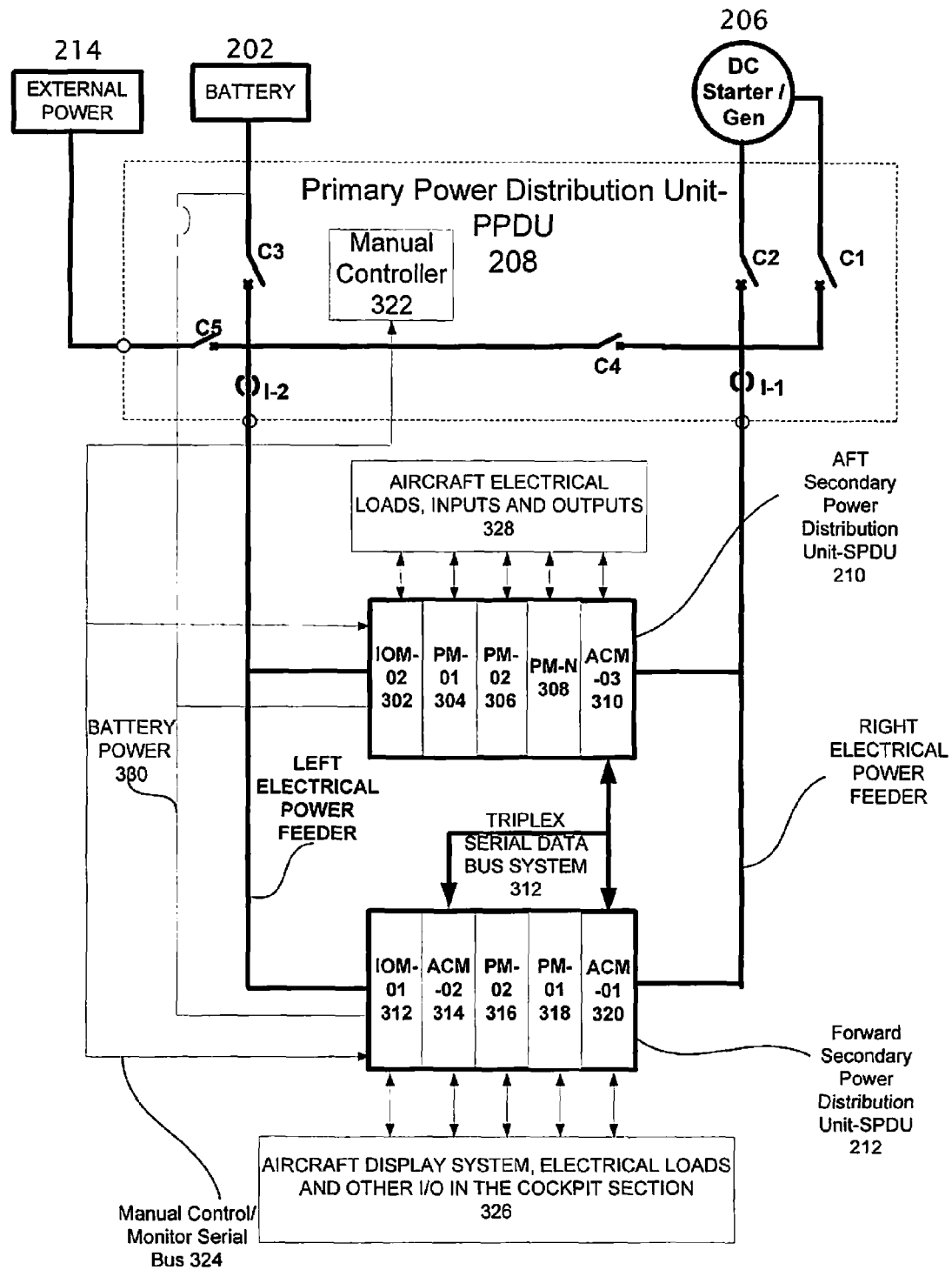
FIG. 3 is a block diagram showing further details of the single generator secondary electrical power distribution system.

The system shown in FIG. 2 and FIG. 3 is a unique system, which may utilize commonly constructed modules that may also be assembled in in different system configurations depending upon need.

The following is a summary of the unique characteristics of this system: the arrangement of the contactors in the primary power distribution system; the manual mode controller in the primary power distribution system; two main power feeder arrangements that connect the primary power to the secondary power distribution system; a secondary system may consist of one or several units located strategically to minimize wiring; each Secondary Power Distribution Unit (SPDU) layout utilizing a variety of modules to provide the desired functionality; each load in the secondary system is essential (i.e. the load receives power from at least two sources); the provision of a redundant main control system utilizing a triple or quadruple redundant high speed serial busses to communicate normal control and monitoring of the system to the various modules; a dissimilar backup path used to transmit back-up commands in the manual mode; and inclusion of a standby-generator or a standby battery (emergency power arrangement).

FIG. 2 is a block diagram of an example of an aircraft single generator DC electrical power distribution system 200. The system includes a primary power distribution unit ("PPDU") 208, which is coupled to one or more secondary power distribution units 210, 216.

The system includes one generator (206) and a main battery 202 and is supported by a standby generator or a standby battery 204, all of which are coupled to a primary power distribution unit 208. In the single generator configuration, the system will typically utilize one generator and at least one battery. External power 214 may also be coupled to the PPDU 208.

DC starter generator 206 includes a first terminal coupled to a first terminal of contactor C1. DC starter generator 206 includes a second terminal coupled to a first terminal contactor C2. Battery 202 includes an output coupled to a first terminal of contactor C3. External power 214 includes a first terminal coupled to a first terminal contactor C5. Standby power generator or battery 204 may be coupled to the right or left power feeders through its own set of contactors.

Contactor C3 and C5 both include a second terminal coupled in common and also to a current sensor I2 first port as well as a first port of contactor C4. A second terminal of contactor C4 is coupled to the second terminals of contactors C1 and C-2. This junction is also coupled to a first port of current sensor I1.

A second port of current sensor I1 forms the left power feeder path that is coupled to first ports of secondary DC power distribution units 210 and the 216. The second terminal of current sensor I2 defines the right power feeder path that is coupled to second ports of the secondary DC power distribution units 210 and 216. Control lines couple the SPDU units 210 and 216 to the primary power distribution unit 208. Secondary power units 210, 216 may be located in any desired location in the aircraft, here in this example they are located fore and aft.

The primary power distribution unit 208 includes a unique contactor arrangement c1-c5, current sensing I-1, I-2, and manual electronics as shown in the figure. The system is unique in that in this arrangement, all aircraft loads can receive power from the main battery 202, from the generator 206, or from the standby battery 204.

The system 200 may include two independent units, one hosting the generator hardware and the other hosting battery hardware if required for zonal safety. For example, The arrangement of the sources, with the exception of the main generator with respect to the PPU is also flexible as long as the protections are able to isolate a failure Aft secondary DC power distribution unit 210 and forward secondary DC power distribution unit 216 functions as described in detail later in this document. Generally, the SPDUs can include three types of modules: Power Modules (PM), Aircraft Computing Modules (ACM), and Input/output modules (IOM).

FIG. 3 is a block diagram showing further details of the single generator secondary electrical power distribution system 200. In particular this diagram shows the configuration of the various modules 302, 304, 306, 308, 310, 312, 314, 316, 318, 320 in the secondary power distribution units 210, 212. The SPDUs 210, 212, do not include identical modules.

The power distribution system 200 may include two secondary power distribution units ("SPDU"), in which one is located near the cockpit (forward SPDU 212, and the other is located toward the back of the aircraft (aft SPDU) 210. The number of secondary power distribution units is variable as some aircrafts may utilize only one, or a plurality depending on criteria such as the fault hazard assessment ("FHA") requirements or zonal considerations.

The secondary power distribution unit's 210, 212 modules may be summarized in the following paragraphs.

Power Modules (PMs): the power modules 304, 306, 308, 316, 318 perform switching control and protection of a number of electrical loads, various I/O operations, and is configured to perform various control computations.

Aircraft Computing Modules (ACMs): The ACMs in the system perform the logic required to operate the system. The aircraft computing modules 310, 314, 320 perform the control, monitoring, and other functions such as crew alerting system messaging for annunciation, fault isolation, and communications within the system or with external systems. The aircraft computing module also contains various I/O capabilities.

I/O modules (IOMs): The I/O modules perform the data acquisition function for the aircraft computing modules and communicate aircraft computing module outputs to the aircraft systems. The I/O module has several configurations that support different I/O arrangements, and is configured to perform various control computations. Here, control of the contactors c1-c5 in the primary power distribution unit 208 is activated by control signals from the I/O modules 302 disposed in the secondary system 210, 212.

The system 200 normally controls the contactors in the PPDU 208, and the electronic circuit breakers through the aircraft computing modules 310, 314, 320 and the associated PMs 304, 306, 308,316,318 and I/O modules 301, 312 to configure power for various control sequences. These control sequences include power up, engine start, operation on the ground without the generator, normal operation with one battery and one generator, Emergency reconfiguration and operation, preflight testing, built in test, fault isolation, and the like The system 200 has a manual mode which allows the pilot to directly access the contactors C1-C5 in the PPDU 208 and all the loads coupled to the PMs manually 322 by bypassing the normal control system through a serial bus structure that is referred to as the manual control/monitor serial bus 324.

In the manual mode, raw data from the circuit breaker and the electrical control panels is transmitted to the power modules 304, 306, 308, 316, 318 and the contactors C1-C5 in the PPDU for control. Other data such as annunciation and status is transmitted from the system components to the pilot.

The manual bus 324 is driven by the forward I/O module 312 which receives commands from the electrical control panel in the cockpit (not shown), and electronic circuit breaker control commands from the display system (not shown).

Current sensors and voltage measurements are used throughout the system to detect shorts or failures and reconfigure the supply of DC power accordingly.

The primary power distribution unit 208 is configured as previously described. Current sensor I-1 is coupled to the right electrical power feeder, and the current sensor to I-2 is coupled to the left electrical power feeder. The right and left electrical power feeders are both coupled to the aft secondary power distribution unit 210 and the forward secondary power distribution unit 212. The triplex serial data system bus 312 is coupled to the ACM module 310 of the aft secondary power distribution unit 210, and ACM modules 314, 320 of the forward secondary power distribution unit 212.

The aft secondary power distribution unit 210 is coupled to the aircraft electrical loads input and outputs 328 while the forward secondary power distribution unit 212 is coupled to the aircraft display system, electrical loads, and other I/O in the cockpit 326. Battery power bus 380 is coupled to the forward secondary power distribution unit 212 and the aft secondary power distribution unit 210. Battery power from the primary power distribution unit 208 is also coupled to the aft secondary power distribution unit 210 and the forward secondary power distribution unit 212.

Aft secondary power distribution unit 210 includes I/O module 302 ACM module 310 and one or more power modules 304, 306, 308. The forward secondary power distribution unit 212 includes an I/O module 312 and ACM module 314, 320 and power modules 316, 318.

Figure 4:
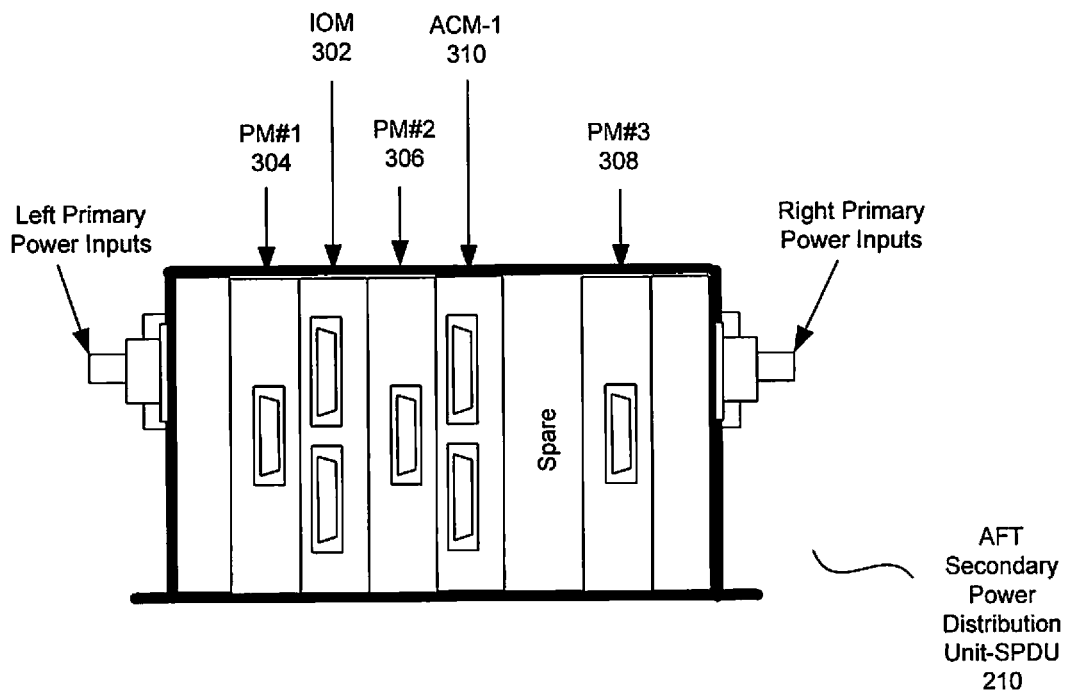
FIG. 4 is a diagram showing the mechanical configuration of the secondary power distribution circuits.

FIG. 4 is a diagram showing the exemplary mechanical configuration 400 of the secondary power distribution circuits (210 of FIG. 2). As can be seen the SPDU 400 may include power modules 304, 306, 308, I/O modules 302 and ACM modules 310 that are coupled to a back plane structure, so that modules may be installed in various slots according to a given configuration design. Left and right primary power inputs may be coupled to the SPDU 400 for routing through the bus structure of the SPDU, and modules so power may be routed to and from loads as desired. The figure shows the general secondary power distribution unit's layout (210 of FIG. 2), however other arrangements may equivalently be provided, and the module may be equivalently provided with the ability to couple to more modules than shown in this example.

b) A Twin Generator Aircraft Utilities and Power Distribution System

Twin generator architectures satisfy many of the mid-sized business jets and twin engine helicopters requirements for safety. Like the single generator power distribution system previously described, this version of a twin generator system utilizes two primary feeders to power the secondary power control system. In the following examples of multiple generator configurations in FIGS. 5-7, the power distribution system utilizes at least two generators and at least one battery.

Figure 5:
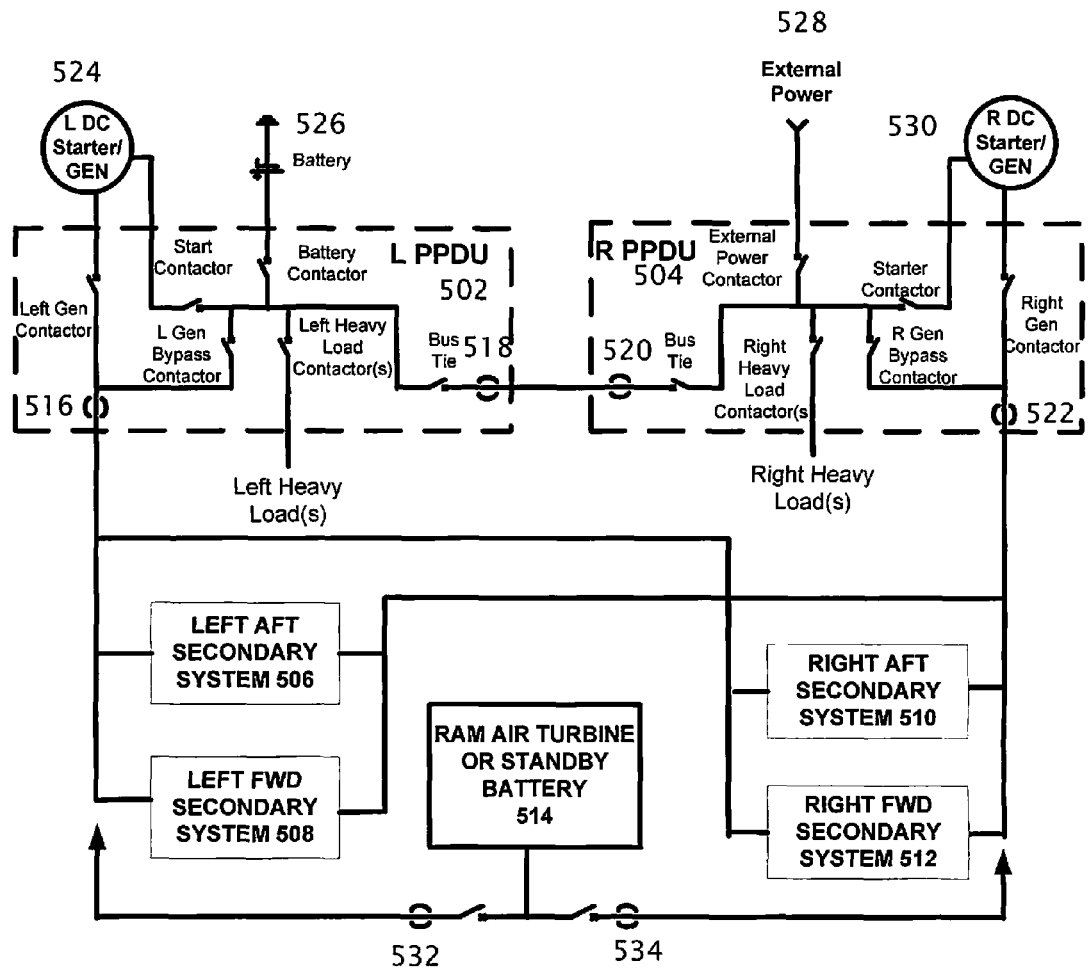
FIG. 5 is a block diagram of a twin generator, one battery and ram air turbine ("RAT") power distribution system.

FIG. 5 is a block diagram of a twin generator, one battery and ram air turbine ("RAT") power distribution system 500. The system configuration is for a two generator, one battery system with an optional ram air turbine for emergency operation. The system includes two independent primary DC power distribution units ("PPDUs") 502, 504. Each primary DC power distribution unit contains the manual controller.

Figure 6:
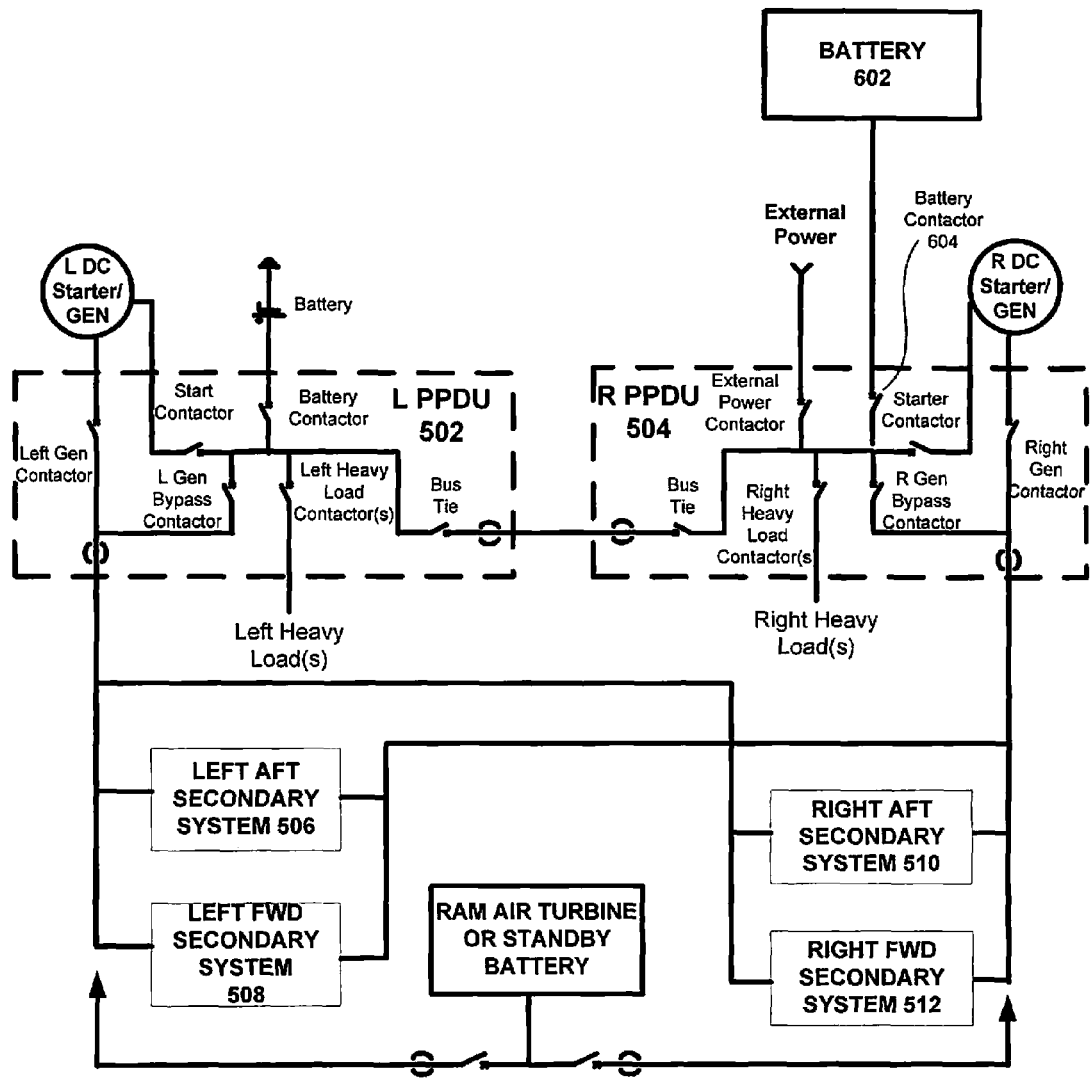
FIG. 6 is a block diagram of a twin generator, two battery and ram air turbine power distribution system in accordance with the principle of the invention.

FIG. 6 is a block diagram of a twin generator, two battery and ram air turbine power distribution system in accordance with the principle of the invention. The system configuration for a two battery, two generator system with an optional ram air turbine for emergency operation is shown. This configuration is the same as that described in FIG. 5 except for the inclusion of additional battery 602, coupled to a battery contactor 604 of the right PPDU 504.

Left DC starter in generator 524 includes first and second terminals coupled to the left PPDU 502. A battery 526 is coupled to left PPDU 502. Right PPDU 504 includes external power 528 coupled to it, and two terminals of right DC starter in generator 530 coupled to also. Left PPDU includes a current sensor 518 which is coupled to right PPDU's 504 current sensor 520.

Current sensor 516, of the left PPDU is coupled to a first terminal of left aft secondary system 506, first terminal of left forward secondary system 508, first terminal of right aft secondary system 510, and first terminal of right forward secondary system 512.

Current sensing terminal 522 of right PPDU 504 is coupled to a second terminal of left aft secondary system 506, second terminal of left forward secondary system 508, second terminal of right after secondary system 510, and the second terminal of right forward secondary system 512. A ram air turbine or alternatively a standby battery 514 may be coupled to the first terminals of module 508 or the second terminals of modules 512 by appropriate contactors being engaged. Each contactor is also equipped with current sensors 532, 534.

Left PPDU 502 includes a left generator contactor coupled to a first terminal of generator 524 and having its second terminal coupled to current sensor 516 and the first terminal of left generator bypass contactor. Left generator bypass contactor includes second terminal coupled to a first terminal of start contactor, and the start contactor includes a second terminal coupled to a second terminal of left DC starter generator 524. First terminal start contactor is also coupled to a junction of terminals coupled to first terminals of battery contactor, left heavy load contactor and a bus tie. Second terminal of the heavy load contactor is coupled to heavy loads. Second terminal of the battery contactor is coupled to the battery 526. The bus tie has a second terminal coupled to current sensor 518. A right PPDU 504 is similarly connected however instead of battery 526 it provides an external power contactor coupled external power 528. Right and left PPDU 502, 504 may be connected to left heavy loads and right heavy loads, respectively.

FIGS. 5 and 6 each include four secondary power distribution units 506, 508, 510, 512 but this number can vary in accordance with requirements for on the electric load concentration zones and the zonal safety requirements of the installation in the aircraft.

Figure 7:
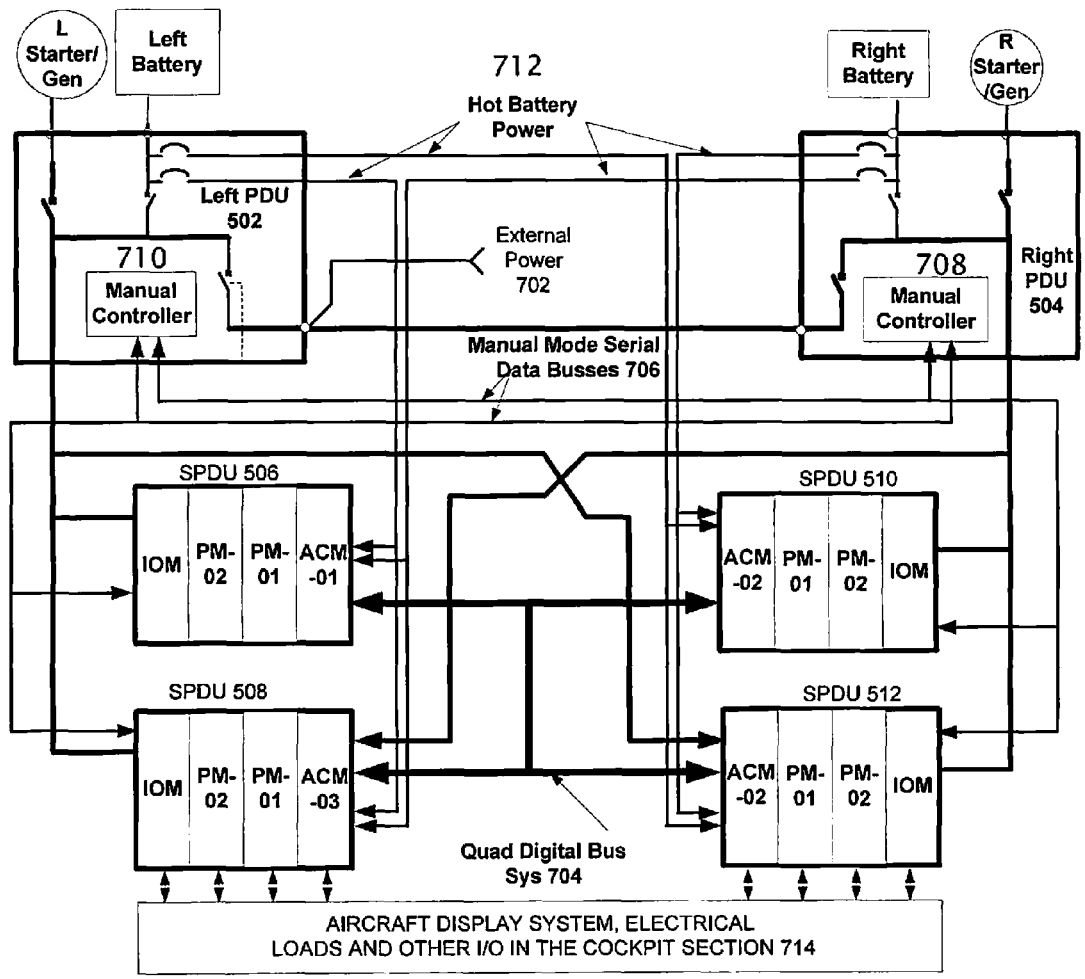
FIG. 7 is a block diagram of a twin generator, four secondary power distribution units configuration in accordance with the principle of the invention.

FIG. 7 is a block diagram showing further detail of the twin generator, four secondary power distribution units configuration shown in FIGS. 5 and 6. The figure provides a more detailed view of the system shown in FIG. 6, which has two batteries. The figure also describes the function of FIG. 5 in more detail simply by removing the second battery from the provided description.

Figure 8:
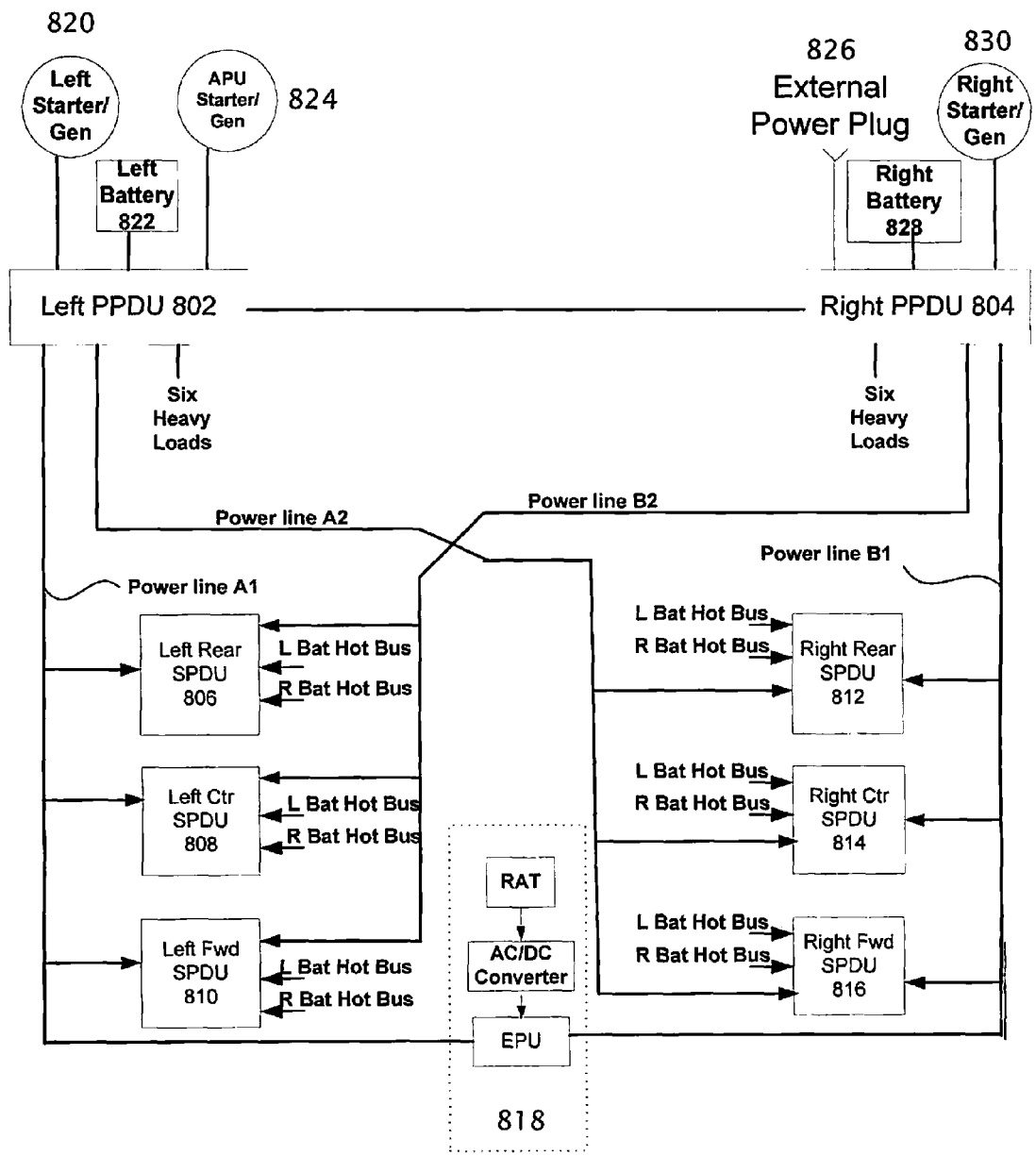
FIG. 8 is a general block diagram of a high availability twin generator primary and secondary power distribution system with six secondary power distribution units.
Figure 9:
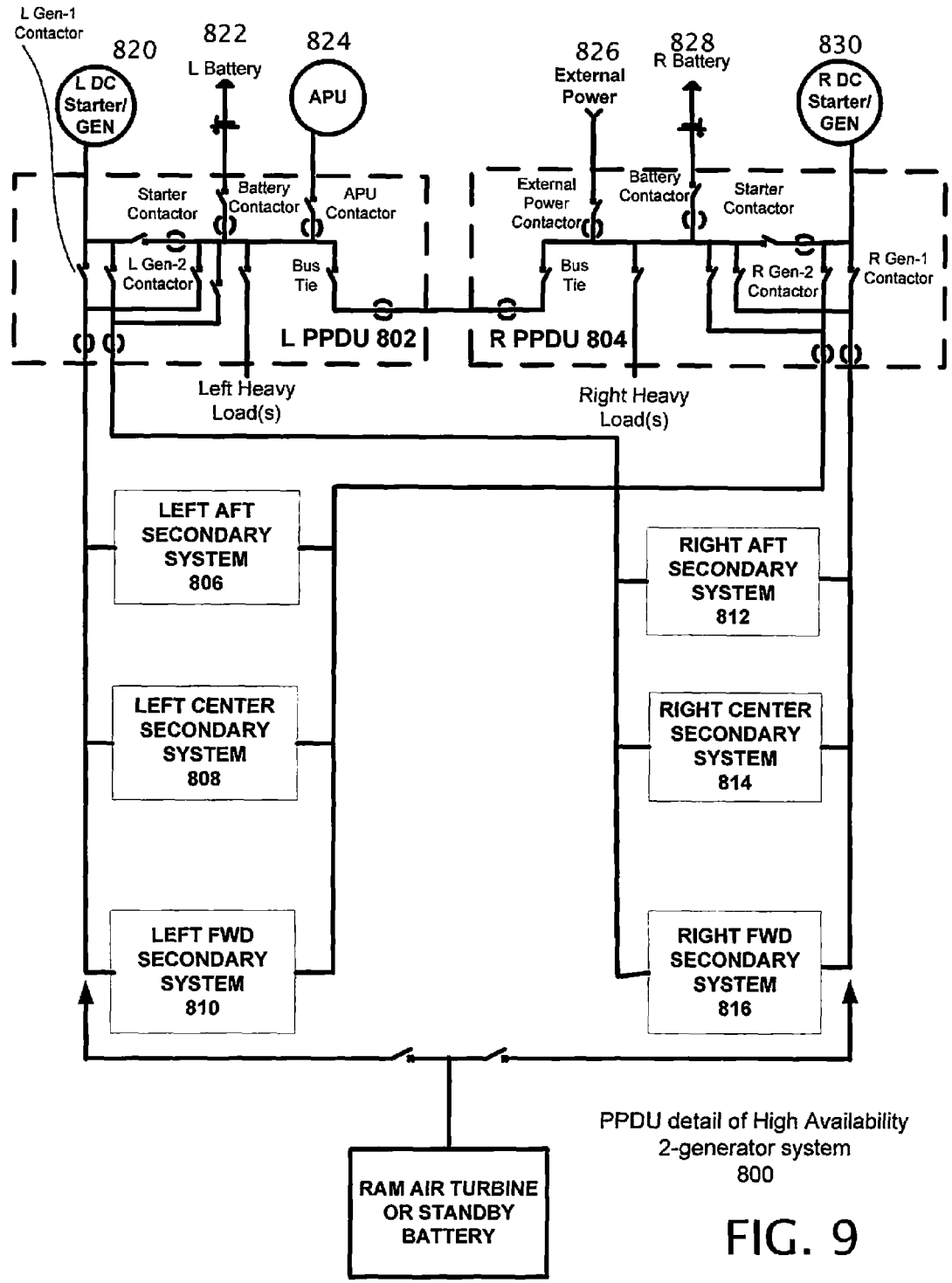
FIG. 9 shows further details of the high availability power distribution system of FIG. 8.

This twin generator system may provide a number of functionalities. Features include the addition of a manual controller 710, 708 in each primary DC power distribution unit 502,504. The primary DC power distribution unit contactors are normally controlled in this example by the primary control system aircraft computing modules, power modules ("PMs") and I/O modules disposed in the secondary power distribution units 506, 508, 520, 512. Primary DC power distribution unit contactors can be controlled via the embedded manual controller. The system is capable of detecting failures (shorts) and further determining a safe reconfiguration of the system. Each manual controller receives its manual data from two independent serial busses 704, 706. Each secondary power distribution units receives up to four direct power inputs, and is also capable of receiving emergency power. The secondary power distribution units 506, 508, 510, 512 communicate with each other via a high speed serial data bus 706. The heavy loads are protected via a fuse or a current monitor as desired. In the example shown the external power input 702 does not require an exclusive connector and utilizes the bus ties for isolation. And finally, the emergency power contactors control is performed by the emergency power units ("EPUs") (not shown).

c) A High Availability Twin Generator Aircraft Utilities and Power Distribution System This exemplary configuration is similar to the previously described twin generator primary and secondary power distribution system. It differs in the following detail: instead of two primary power feeders, this example utilizes four power feeders to satisfy higher levels of availability and zonal safety requirements that may be called for in certain applications. FIGS. 8 and 9 focus on showing the power system without showing the details of the control system. The manual control path and the various busses are addressed in FIG. 10 which covers the details of the control system.

FIG. 8 is a general block diagram of a high availability twin generator primary and secondary power distribution system with six secondary power distribution units. Coupled to the left PPDU 802, are a left starter generator 820, a left battery 822, and an APU starter generator 824. Six heavy loads are also coupled to left PPDU 802.

Coupled to the right PPDU 804 is an external power plug 826, a right battery 828, and a right starter generator 830. Six heavy loads are also coupled to the right PPDU 804.

A left rear SPDU 806, a left of center SPDU 808, and a left forward SDU 810 each include a first terminal or power line A1 coupling them to the left PPDU 802. These modules 806, 808, 810 each include couplings to a left battery hot bus and right battery hot bus. A modules 806, 808, 810 also include a second terminal or powerline B2 coupled to right PPDU 804.

A right rear SPDU 812, a right center SPDU 814, and right forward SPDU 816 each include a first terminal, or powerline A2 that is coupled to left PPDU 802. The modules 812, 814, 816 also include a second terminal or powerline B1 coupled to right PPDU 804. These modules 812, 814, 816 each include couplings to a left battery hot bus and right battery hot bus.

A ram air turbine or standby battery 818 includes a first terminal coupled powerline A1 and the second terminal coupled to powerline B1. The ram air turbine or battery standby 818 may include an EPU and AC to DC converter and a ram air turbine. Alternatively a battery may be substituted for the three previously mentioned components.

FIG. 9 shows further details of the high availability power distribution system of FIG. 8. However, the manual controller is not shown but is part of the system. Left generator —1 contactor has a first terminal coupled to the left DC starter generator 820 and the second terminal coupled to the first terminal of the left aft secondary system 806. A starter contactor includes a first terminal coupled to the first terminal of the left generator starter contactor. A left generator 2 contactor includes a first terminal coupled to the first terminal of the left generator 1 contactor. The second terminal of the left generator 1 contactor is coupled to the second terminal of left generator 2 contactor which is coupled to the first terminal of the battery contactor and the first terminal of local contactor, and the first terminal of a heavy load contactor. Also coupled this terminal is the first terminal of the bus tie and the first terminal of an APU contactor second terminal of battery contactor is coupled to left battery 822 the second terminal of APU contactor is coupled to the APU 824. The second terminal of the bust tie is coupled to the right PPDU 804.

The right PPDU 804 is coupled to the left PPDU 802 through a contactor second terminal the contactor or buss tie has a first terminal coupled to the first terminal of an external power contactor, the external power contactor has a second terminal coupled to external power 826. A first terminal of the contactor is coupled to the first terminal of the bus tie and it's second terminal is coupled to the right heavy loads. The first terminal of contactor is coupled to a first terminal of the battery contactor. The battery contactor has a second terminal coupled to battery 828. A starter contactor is coupled to the first terminal of the battery contactor and second terminal that starter contactor is coupled to the right DC starter generator 830. The right generator —1 contactor includes a first termi-nal coupled to the right DC starter generator 830 and second terminal coupled to a second terminal of the right aft secondary system 812. The right generator 1 contactor has the first terminal coupled to a right generator 2 contactor second terminal. The right generator 2 contactor's first terminal is coupled to the first terminal of the starter contactor. A contactor has a first terminal coupled to the first terminal of the battery contactor and it's second terminal is coupled to this first terminal of right generator to contactor. This terminal is coupled to the second terminal of the left aft secondary system.

Current sensing elements are included in the APU contactor lead, the battery contactor and the starter contactor lead. Current sensors are also between left and right PPDU 802, 804 having separate current sensors in each module. Right PPDU 804 includes current sensing elements in the external power contactor lead, the battery contactor lead, the right starter to generator contactor lead, and the connections going to the second terminal of the left aft secondary system 806 and the second terminal going to the right aft secondary system 812.

Figure 10:
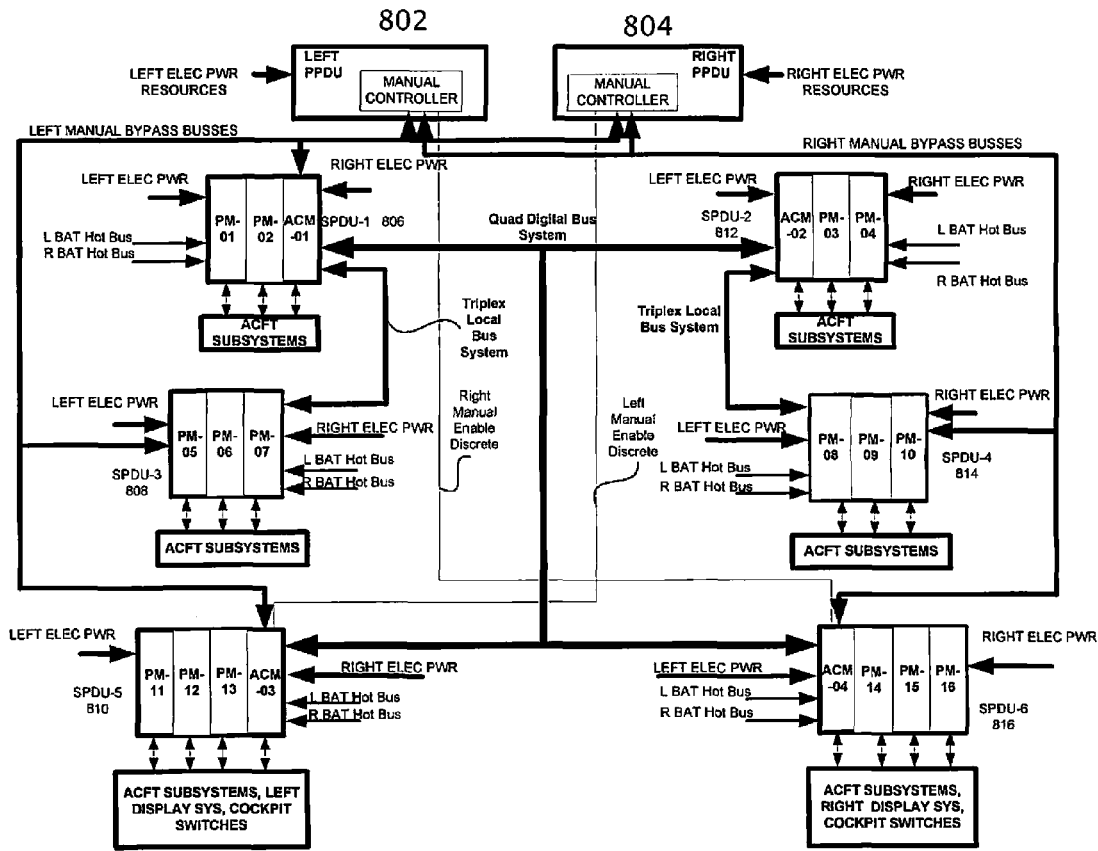
FIG. 10 illustrates the high availability power distribution system control system showing further detail of the control system.

FIG. 10 illustrates the high availability power distribution system control system showing further detail of the control system.

FIGS. 9 and 10 shows the high availability system configuration. The primary difference between this system and the twin engine system provided in FIG. 5 is in the number of primary power feeders that connect the primary power distribution units to the secondary power distribution system. The system presented in FIG. 5 utilizes two primary power feeders: one on the left and the other on the right side of the aircraft. The system presented in FIG. 9 utilizes four power feeders to connect the primary to the secondary system thus requiring multiple failures before all power is lost. The control system for either configuration performs the same functionality.

Further alternative examples are contemplated for example by providing additional generators, such as three or four generators.

The Secondary Electrical System-Secondary Power Distribution Units ("SPDUs")

The secondary power distribution system may be provided through the use of secondary power distribution units, which are typically modular constructions and may be incorporated into a design in accordance with the system specifications such as zonal electrical loads distribution needs in the aircraft. The flexibility in incorporating the SPDUs has been previously described as the SPDUs have been incorporated into the systems previously described: the novel single generator electrical system; the unique twin generator primary and secondary power distribution system; the unique high availability twin generator primary and secondary power distribution system; and other equivalent configurations.

As noted previously, the secondary power distribution units (400 of FIG. 4) modular design contains 3 types of modules to accomplish various purposes:

Power Modules (PMs). The power modules perform switching control and protection of a number of electrical loads, some limited input output ("I/O") operations, and may be configured to perform limited control computations.

Aircraft Computing Modules (ACMs). The aircraft computing modules can perform the control, monitoring, and other functions such as crew alerting system ("CAS") messaging for annunciation, fault isolation, and communications within the system, or with external systems. The aircraft computing module contains some I/O capabilities.

I/O modules (IOMs). The I/O modules perform the data acquisition function for the aircraft computing modules and communicating aircraft computing module outputs to the aircraft systems. The I/O module has several configurations that support different I/O arrangements, and has the ability to perform various limited control computations.

Each secondary power distribution unit receives power from two primary power feeders in the aircraft and two hot battery power feeders. In the one battery configuration, the two battery power inputs are externally connected via a power jumper.

Figure 11:
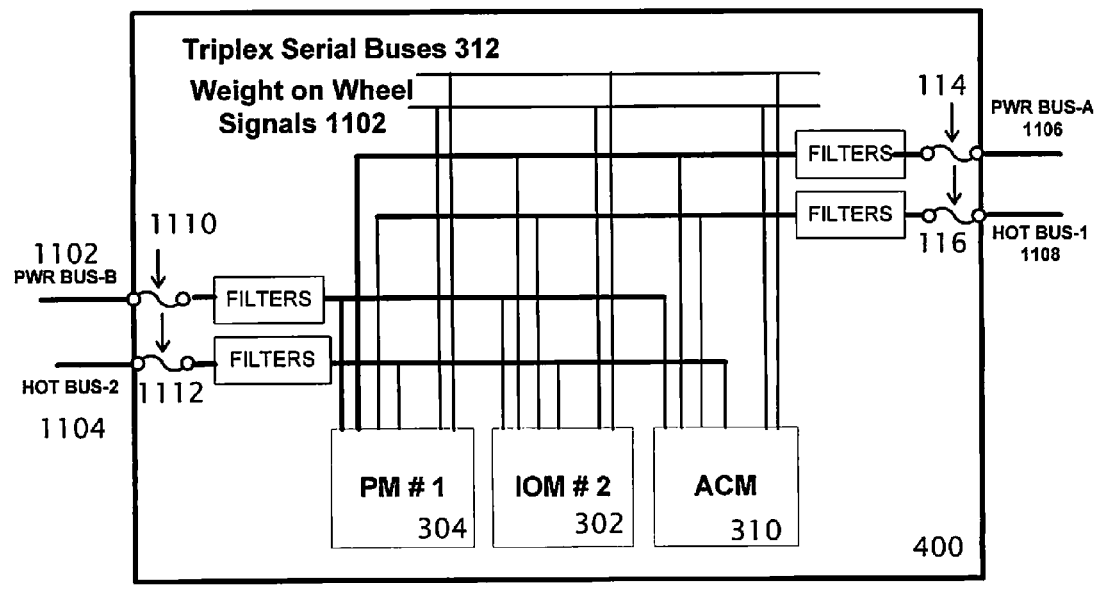
FIG. 11 shows exemplary components interconnect within the secondary power distribution unit's module.

FIG. 11 shows exemplary components 304, 302, 310 interconnect within the secondary power distribution unit's module 400. Each secondary power distribution units is housed in a sturdy aluminum enclosure with four conductive mounting feet for excellent electrical bonding. Access to each module is proved allowing for efficient trouble shooting or maintenance activity.

The interconnection shown between the components may be provided in a backplane, or its equivalent, of the secondary power distribution units. Such a backplane arrangement may be scalable, by providing additional connections for adding additional modules, depending upon the needs of a particular system. Bussed communications from the modules 304, 302, 310 may include power, 102, 104, 106, 108, a triples serial bus 312, weight on wheel ("WOW") signals 1102, and the like. The main power feeders 1102, 1104, 1106, 1108 may be internally protected by fuses 1110, 1112, 1113, 1114 in the two main feeder configurations to prevent common mode failures within the secondary power distribution units from causing catastrophic failure of the entire power distribution system. However, such main power protections within the secondary power distribution units are not necessary in the four primary feeder configurations since protection is provided by primary DC power distribution unit. Filtering may also be provided to suppress interfering signals such as EMI, lightning strikes, and the like.

In the secondary power distribution system the following are of note:

- All components within the secondary power distribution units receive power from all sources.
- All components in the secondary power distribution units are interconnected via 3 independent serial digital busses.
- All components in the secondary power distribution units receive weight on wheels ("WOW") inputs which are used to indicate when the aircraft is in the air.

Since this system supports fly by wire aircrafts, one of the objectives of this secondary system architecture is to maximize the availability of power to the aircraft loads while maintaining the lowest parts count to reduce weight. High load availability is achieved by:

- System design such that every load in the system is treated as an essential load. In this design, which is an "essential load" design, each load is capable of receiving power from the left and right PPDU. In effect, each load in the secondary power distribution system is configured to receive power from any of the power generating sources in the aircraft. When emergency power is connected, each secondary load is capable of receiving emergency power.
- In effect, the system consists of one single electrical power bus (the essential bus) where each load is capable of receiving power from any source in the system bus
- Designing the electronics in such a way that no single failure in the control system will cause the loss of the load.
- Designing each secondary power distribution units to receive power directly from the left and right batteries since some loads in the secondary power distribution system require battery hot bus power—battery power can also be used for other aircraft loads under certain emergency conditions.
- Modular components to minimize parts count, spares, and reduce maintenance.
- Lower parts removal and replacement due to a fault tolerant design.
- Four of the secondary power distribution units are interconnected via a triplex high speed serial communication system utilizing, in this example, Time Triggered Protocol (TTP) technology. This high speed system makes all the data generated by each of the components of the system available to the aircraft computing modules which perform the control and monitoring computations of the system. High speed data transmission is necessary for closed loop control required to perform the utilities and secondary flight controls functionality.

The Three Secondary Power Distribution System Modules-ACM, IOM, PM

1) The Aircraft Computing Module (ACM)

Figure 12:
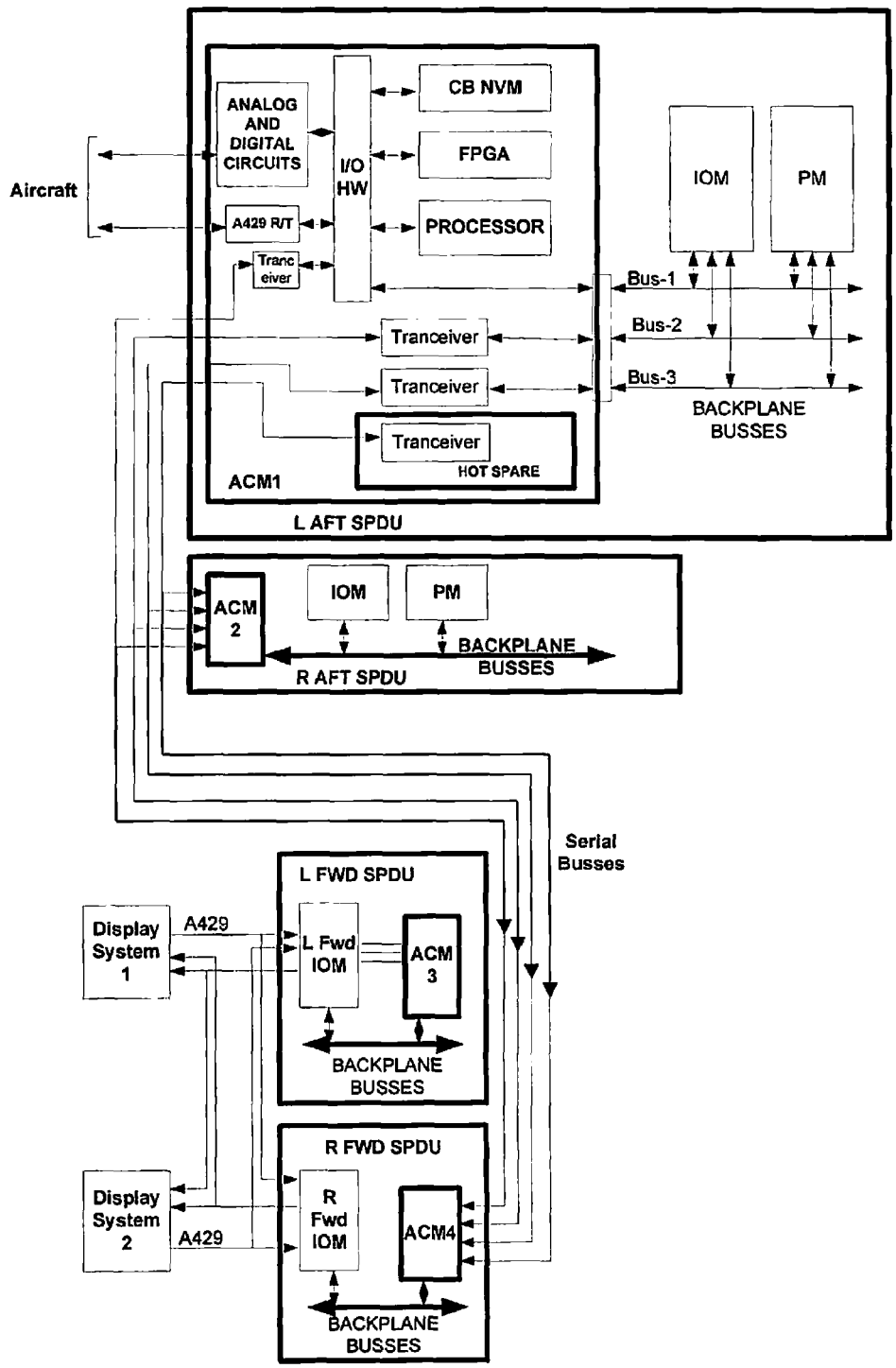
FIG. 12 is a block diagram of the aircraft computing module ("ACM").

FIG. 12 is a block diagram of the aircraft computing module ("ACM"). The aircraft computing modules ("ACMs") (310 of FIG. 3) of the secondary power distribution system provide a number of functions. The aircraft computing module performs the computational logic of the system. There are at least three aircraft computing modules (ACMs) in the system. In an embodiment where four aircraft computing modules are used, three are used to perform identical electrical power system computations, and the fourth is used as a hot spare to improve the dispatch ability of the aircraft.

The ACMs provide control and monitoring of the primary DC power distribution units. Control of the primary system involves managing the resources in the various phases of the flight including when the aircraft is on the ground and the generators are inactive. The ACMs provide reconfiguration of the primary power distribution system under failure conditions. Failure conditions include the loss of resources, shorts and open circuit failures of the electrical power feeders in the system. The ACMs provide control and management of the heavy loads contactors in the primary power Unit. The ACMs provide control and management of all the electronic circuit breakers in the system which includes responding the circuit breaker commands received from the pilot, load management in various phases of flight, emergency load shedding, and load balancing. The ACMs provide engine start and shut down. The ACMs provide load resource allocations. The ACMs provide extensive built in test of all the components in the system to limit the exposure time of failures to one flight. The ACMs provide fault isolation, detection, storage, reporting and trend monitoring. The ACMs provide resource redundancy management. This feature monitors all failures in the system and indicates when maintenance actions become necessary. Since the system is fault tolerant, it is necessary to also embed the logic that determines if the aircraft configuration is safe with the operational resources or if the system requires maintenance.

And finally, the ACMs provide software and hardware configuration consistency management. This feature insures that the software and the hardware that is included in the various components of the system are compatible. Incompatibility is indicated to alert maintenance crew to take corrective actions prior to flight.

In an embodiment where the system is expanded to include systems beyond power distribution such as utilities (Refer to Section 5.0), the functional allocations of the additional functions are assigned based on safety and redundancy requirements. In any case, the design supports the requirement that no single aircraft computing module failure will compromise the safety or workload requirements of the pilot. Because of zonal safety considerations, the aircraft computing modules are located in different secondary power distribution units.

From the electrical system perspective, the aircraft computing modules perform redundant computations that allow the system to continue uninterrupted operation when one or more aircraft computing module failures are encountered. These computations include power up, phase of flight determination, primary and secondary systems configuration, circuit breakers on/off control, load shedding, emergency operation, power management, battery charge determination, generators load balancing, and built in test.

The aircraft computing module also includes non-volatile memory that stores the status of the circuit breaker panel prior to shutdown to retain information regarding the status of each circuit breaker such as the tripped, pulled or locked status and other failures such as tracking failures in the redundant systems to inform the pilot when system configuration does not satisfy the dispatch criteria. This memory is also used to store failures that are detected by the system for maintenance.

Of particular importance, the electrical system remains operational if one, two, three or all four aircraft computing modules are lost. The loss of four aircraft computing module is backed up by the manual mode or by default settings in the power module.

Un-flagged failures of an aircraft computing module are detected and voted out by logic hosted in the power modules or the I/O modules.

The following are design features of the aircraft computing module: there are 3 or 4 aircraft computing modules in the system. The fourth is used as a hot spare to improve aircraft dispatch ability; each aircraft computing module hosts four independent channels of which one performs functional computations—the other 3 are used for high speed communications to connect the other aircraft computing modules to the PMs and the I/O modules. The channels within the aircraft computing module are also used to exchange data between the aircraft computing modules; and the design and functional allocations is such that no single point failure including design error can impact the operation of the four channels.

Also, each aircraft computing module contains two dissimilar processing elements: a power pc based processor which performs part of the functionality; and a flat panel grid array ("FPGA") which performs other parts of the functionality in accordance with the safety requirements for separation and dissimilarity.

Further features of the ACM include: elements of each function are hosted in the processor and/or the FPGA based on the functional integrity requirements; and extensive built-in-test that utilized both computational resources to detect internal and external failures including single event upsets.

Three independent aircraft computing modules power supplies are used. The aircraft computing module power supplies receive power from four sources.

The aircraft computing modules utilize high speed serial communication busses to pass information throughout the system (this example utilizes time triggered protocol ("TTP") busses. The aircraft computing modules communicate with the local modules via three independent serial can busses for data acquisition and control. Data freshness, validity, default, and data wrap algorithms are utilized to ensure the integrity of the data as it is transferred around the system. No single point failures will compromise the operation of all channels within the aircraft computing module.

Multiple applications are hosted in each processor, and has the following characteristics: all software development satisfies design assurance level-A; tasking environment is driven by task frames and cycle hard independent timers; memory management unit ("MMU") is used to partition and protect physical memory so that each task can execute and access data only from the area allocated to it; if any task tries to access another code or data space, an exception prevents the errant task from corrupting the data or execution of another task; each memory partition is cyclic redundancy checked ("CRCed") upon exit. Upon entry into the task the cyclic redundancy check is computed and compared with the stored cyclic redundancy check to detect corruption; multiple failures will cause a hard reset; data wrap monitors are used to detect communication failures; hardware based timer drives the scheduler and limits execution to one task at any time and ensures that the task is completed within the allocated time slot; and a round robin priority scheme is utilized to ensure that all tasks in one cycle are executed.

2) The I/O Module (IOM)

I/O modules are used to perform data acquisition and control and to extend the I/O capabilities of the system. Each I/O module consists of three channels. Each of the channels has channel input circuitry. The channel input circuitry of each of the channels is independent and dissimilar relative to the channel input circuitry of the other channels. Failures in one of the channels are detected through a 3 way comparisons.

There are several types of I/O modules. Each I/O module type utilizes the same processing structure but differs in the analog I/O signal conditioning circuitry. For example, the following describe the resources of the standard I/O module: 26 Ground/Open Discrete Inputs; 10 28/Open Discrete Inputs; 4 Aeronautical Radio, Inc.—429 Receivers; 4 Aeronautical Radio, Inc. 429 Transmitters; 3 CAN bus interfaces; 4 Ground/open outputs/channel—12 Total; and 2 28V/Open outputs/channel—6 Total Although the above represents the standard I/O module design, the hardware is configured to easily accommodate additional circuitry that may be required to satisfy specific customization requirements, such as specific analog interfaces, LVDTs, or other unique sensor requirements. In addition, the I/O modules also include special hardware drivers such as, servos, DC or brushless DC motor drivers in addition to discrete switching.

The following is a summary of I/O module features: the I/O module consists of three independent channels, and each channel is powered by three independent power supplies (Refer to FIG. 13); at the core of each channel is an FPGA that is used to pass and receive data from the aircraft computing modules; the three FPGAs utilized in the I/O module are dissimilar and are developed in accordance with DO-254 requirements; and data freshness, validity, default, and data wrap algorithms function to ensure the integrity of the data.

Each input is received by the three channels via independent hardware. The module has various functional capabilities. Most outputs are driven by multiple channels. Other outputs are driven by the associated channel. No single point failure will compromise the operation of all three channels. One of the I/O module backplane busses is used to provide limited data to support manual mode operation.

Beside I/O operations, the I/O module is also configured to perform various independent functions in support of manual mode or other closed loop functions, such as PWM, or respond locally to inputs and generate outputs accordingly.

3) The Power Module (PM)

Figure 13:
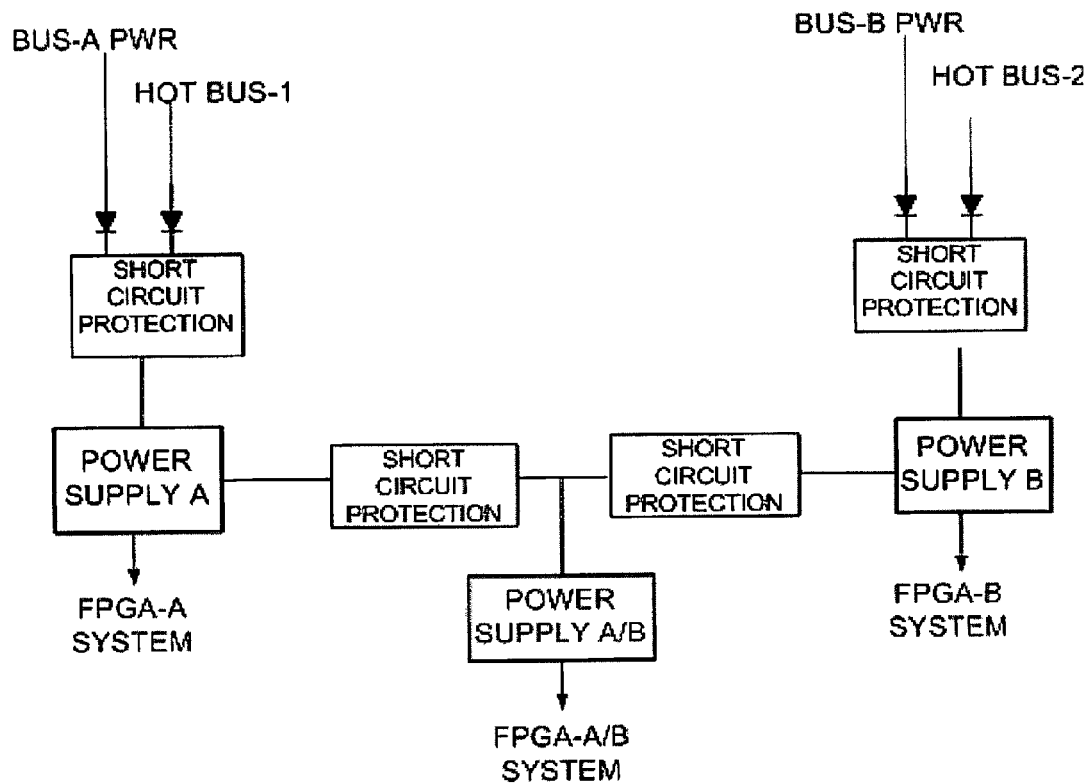
FIG. 13 is a block diagram showing the power supply system for the I/O module and the power module's I/O module and power module ("PM").

FIG. 13 is a block diagram showing the power supply system for the I/O module and the power module's I/O module and power module ("PM"). The block diagram also shows the power supply system for the power module ("PM"). Each power module supports twelve electronic circuit breaker/switch mechanisms. As such the power module receives its power from four sources as shown.

Each module in the system consists of three channels. Two of the channels receive power to drive their logic from two independent sources. The third channel draws its power from both sources. The design is implemented such that no one short in any of the supplies can cause the loss of all three channels.

Each power module supports twelve electronic circuit breaker/switch mechanisms. As such the power module receives its power from four sources as shown in FIG. 11.

Figure 14:
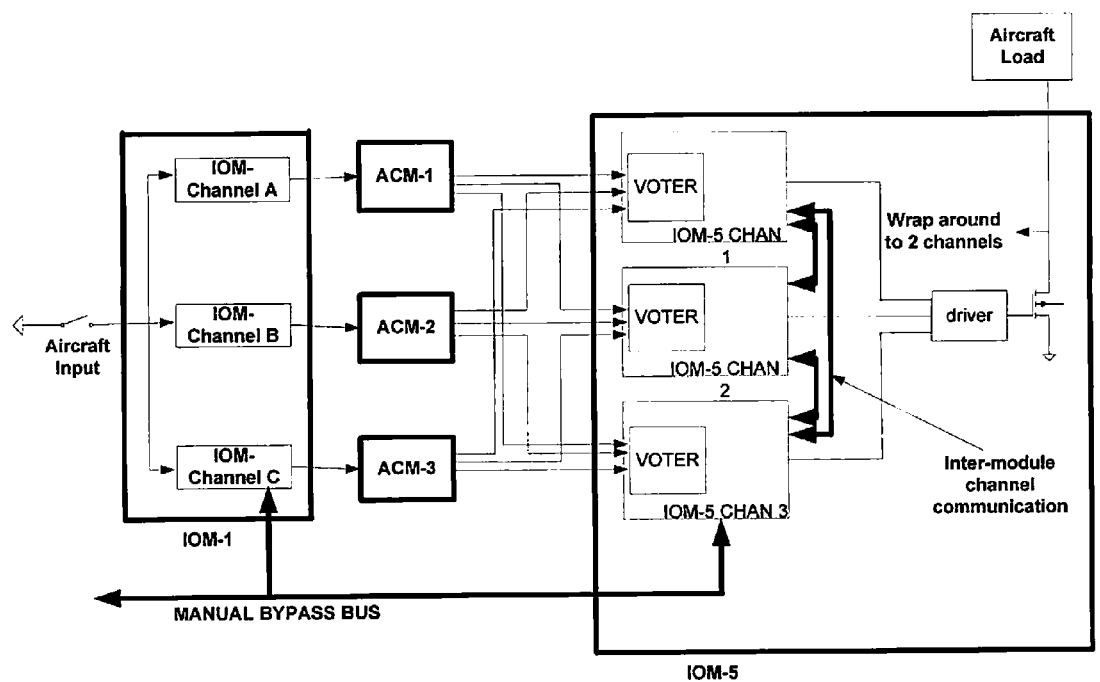
FIG. 14 is a block diagram showing SPDU control.

Communications and Control in the Secondary Power Distribution Units ("SPDUs") of the Secondary Electrical System FIG. 14 is a block diagram showing a typical SPDU control. For example, the system will activate a SPDU Control is asserted.

The SPDU system of the present invention contains four independent controllers (aircraft computing modules). Three controllers or aircraft computing modules will suffice for the power distribution system or utilities. The fourth controller/aircraft computing module may be used to host some functions, but will also act as a hot spare in the event of failures allowing for extended dispatch under failure conditions without compromising safety.

All controllers operate in an active/active mode where each of the controllers provides control over the entire system. All aircraft computing modules in the system receive the same inputs via independent hardware within the I/O modules. Each controller produces its commands accordingly and transmits these commands to power modules for control. Each power module receives three commands, one from each of the controllers, and uses voting logic to decide on which of the commands will be passed to the load.

The figure shows a single ground/open discrete input into I/O module-1 and a single Ground/open discrete output that is generated by I/O module-5. The requirement states that when the I/O module-1 input is asserted, the I/O module-5 output shall be asserted.

Since I/O module-1 contains three channels, three instances of the status of IMO-1 input are transmitted to aircraft computing module 1, 2, and 3. Each aircraft computing module then utilizes a voter to decide which of the three I/O module-1 inputs to relay to all three channels in I/O module-5. The channel in control logic in I/O module-5 utilizes a voter to decide what to apply to the output circuit. In effect, no single point failure will cause any loss of functionality, in accordance with the principle of the invention. In this case, the system can tolerate 2 failures without the loss of any functionality.

Logic in the module may be utilized to resolve the following situations: loss of one controller; un-flagged failure of one controller; loss of two controllers; loss of one controller followed by a detecting of a disagreement between the remaining controllers; loss of three controllers; and loss of communication with all controllers.

From a control point of view, this system is designed for comprehensive actions because all the system information is available to the controls all the time. The logic in the system can deal with the variations and manage the power and utilities systems as needed.

The communication system between the modules is deterministic and satisfies avionics systems safety requirements for communication.

The Circuit Breaker Panel

The circuit breaker panel is embedded in the display system. The electrical power distribution system receives circuit breaker commands from the circuit breaker panel via digital serial busses (Typically A429 busses).

The pilot has the capability via the circuit breaker panel to perform the following circuit breaker operations: Manually pull or reset a circuit breaker. Or, manually lock or unlock a circuit breaker.

The Electrical Power Distribution system transmits the status of each electronic circuit breaker, the voltage and current measurements of the primary power distribution system to the pilot via other digital serial busses (Typically A429 busses) to the pilot.

The electrical power distribution system transmits the following indications related to each circuit breaker circuit in the system: the circuit breaker is tripped/not tripped; the circuit breaker failed/not failed; the circuit breaker is pulled/not pulled; the circuit breaker is locked/unlocked; primary power is not available to the circuit breaker; and the load associated with the circuit breaker failed (open circuit).

The Cockpit Control Panel

Figure 15:
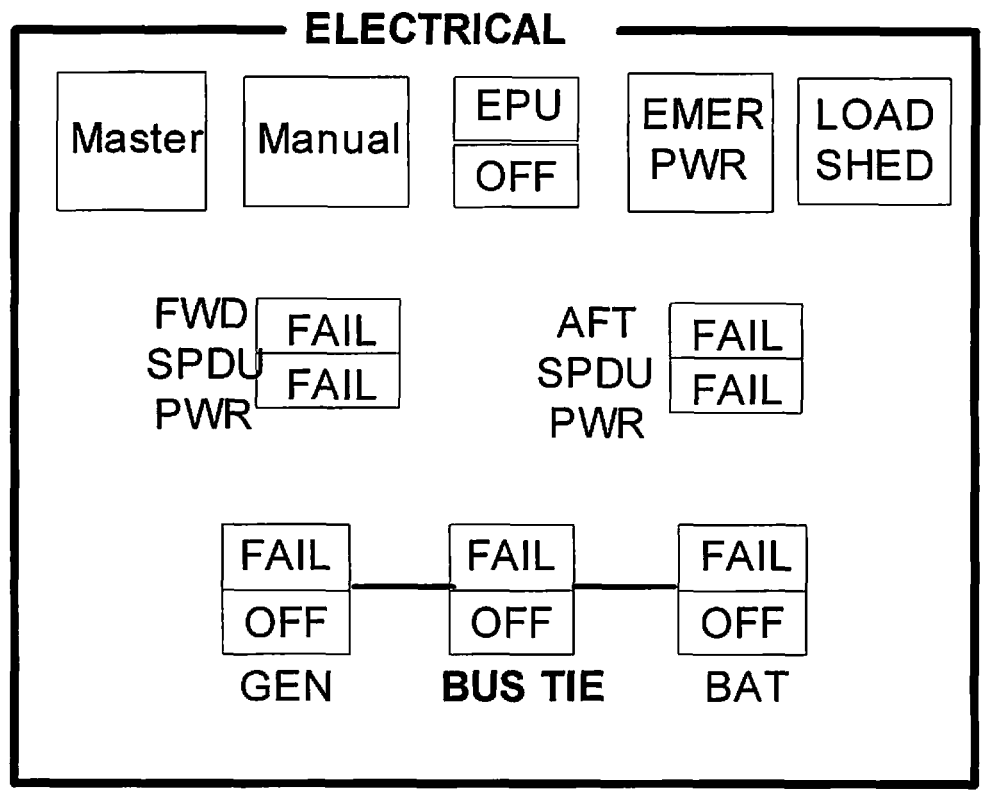
FIG. 15 is a pictorial diagram of an example of an electrical system control panel.

FIG. 15 is a pictorial diagram of an example of an electrical system control panel or user interface. The cockpit control panel includes a number of control switches that are used to turn on/off the aircraft, the avionics systems, connect the various power sources, manual load shedding, and placing the system in the manual mode.

In the single engine configuration, in an embodiment where the forward secondary power distribution units are located closest to the panel, wiring for most of the switches are connected to the forward secondary power distribution units.

The electrical system control panel design and level of sophistication will be determined by the aircraft original equipment manufacturer ("OEM"). The forward secondary power distribution units in this case, will receive most switch inputs from the electrical panel and may drive any annunciation lights on that panel.

The logic for the illumination of the switch lights or annunciations can be designed to satisfy the desired cockpit lighting philosophy; for example, the control panel may be designed to satisfy dark cockpit lighting requirements, meaning that any light will illuminate only if the component is not in its normal operating position or status.

Additionally, the secondary power distribution units transmit annunciations and voltage/current measurements of the electrical power system for display on the cockpit display system via the serial digital but interface.

Normal system control. The cockpit control panel may allow access to a normal operating mode. The normal mode of operation is designed to take inputs from the various parts of the aircraft and make decisions accordingly. For example, the automatic mode recognizes when to utilize battery power on the ground to activate certain equipment when the generator is off. The system also accounts for other phases of flight to make other control decisions. Normal mode control is accomplished through the aircraft computing modules in the system previously described.

Manual Mode control. The system will transition to the manual mode when the manual switch is pressed. In the manual mode, the power modules and the manual controller of the primary power unit will execute the data be that is received on the manual control/monitor serial bus shown in (324 of FIG. 3) instead of the normal control path. In this case, the power module or the I/O module listening to the manual control/monitor bus will perform simple logical computations, as opposed to performing the computations in the primary control system.

The manual controller is normally inactive but has the ability to control any of the contactors within the primary power unit. The controller is enabled when the manual mode switch is pressed. The manual control switch utilizes two discrete signals to activate the controller to prevent one single point failure from enabling the controller.

The controller is used as a bypass to the normal control system. For example, if the Normal control system disengages a contactor because of erroneous current sensor output indicating that a short is present due to sensor failures, the pilot has the ability to re-engage the contactor via the manual mode which does not account for current sensor data for control.

Aircraft Utilities Systems (Utilities Management without Power Distribution Function)

The utility management system architecture is identical to the secondary power distribution system but does not contain the Power Modules. FIGS. 1 and 2 shows a standalone utility management system.

The maximum effectiveness of this system is achieved when the utility management system subsystems are combined with the previously described electrical power distribution system. By adding I/O module to the system, the role of the system can be expanded without minimal increase to cost and weight, and without compromising safety.

Examples are provided in the following sections to demonstrate how the utility management system works and how it can be implemented within the architecture of the electrical power distribution system.

The primary difference between the utility management system and the integrated power distribution system/utility management system is that the integrated system contains additional I/O modules to support the aircraft subsystems I/O functionality. The functionality computations and allocations of the power distribution system and the utility management system are accomplished by the triple or quad aircraft computing module resources. Aircraft computing module functions are allocated to satisfy FHA and redundancy requirements of the particular aircraft.

Figure 16:
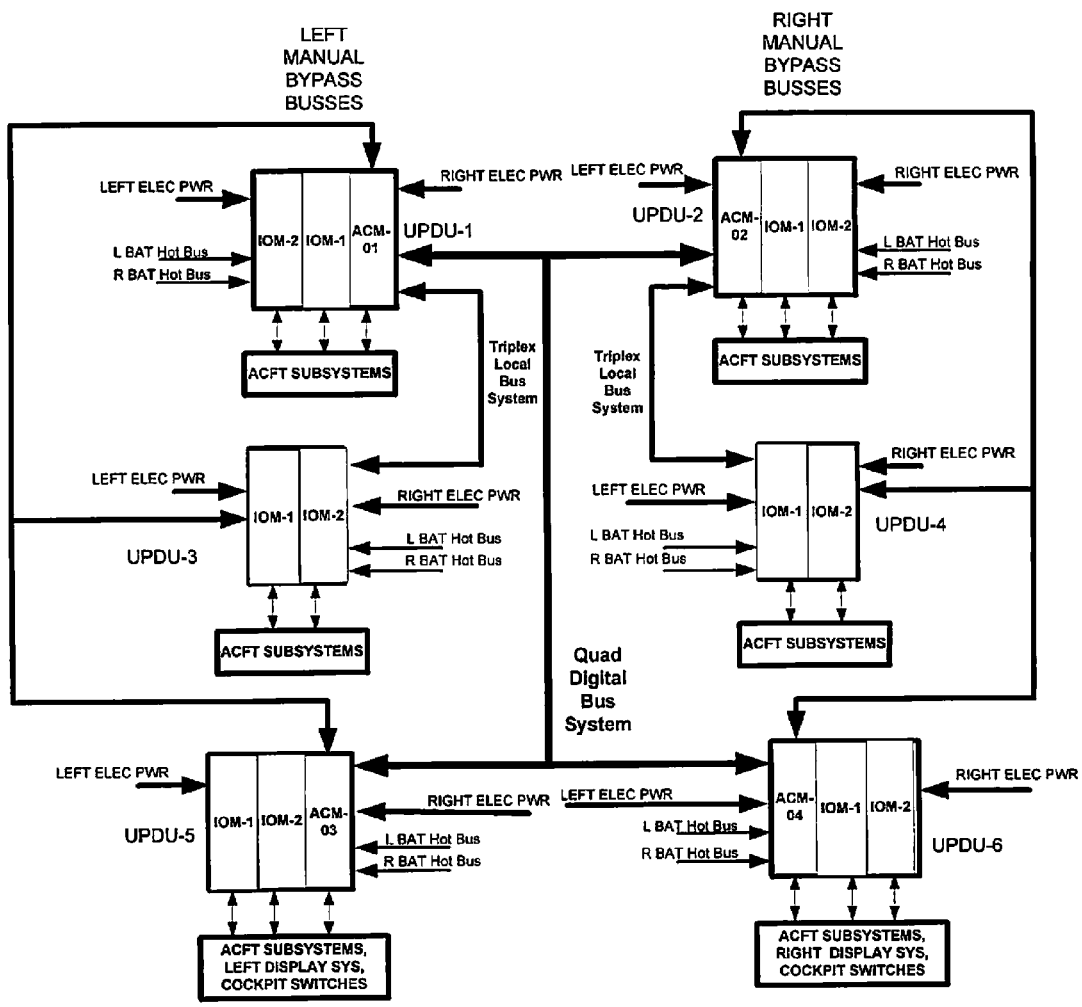
FIG. 16 is a block diagram of a six UPDU UMS configuration.

FIG. 16 is a block diagram of a six UPDU UMS configuration. The system hardware is identical to that hosting the power distribution system with the exception of its I/O capabilities. I/O capabilities may be added to support additional aircraft systems functionality. The system functionality will change by hosting other aircraft systems functionality in addition to the Electrical system functionality.

Landing Gear System Example

Figure 17:
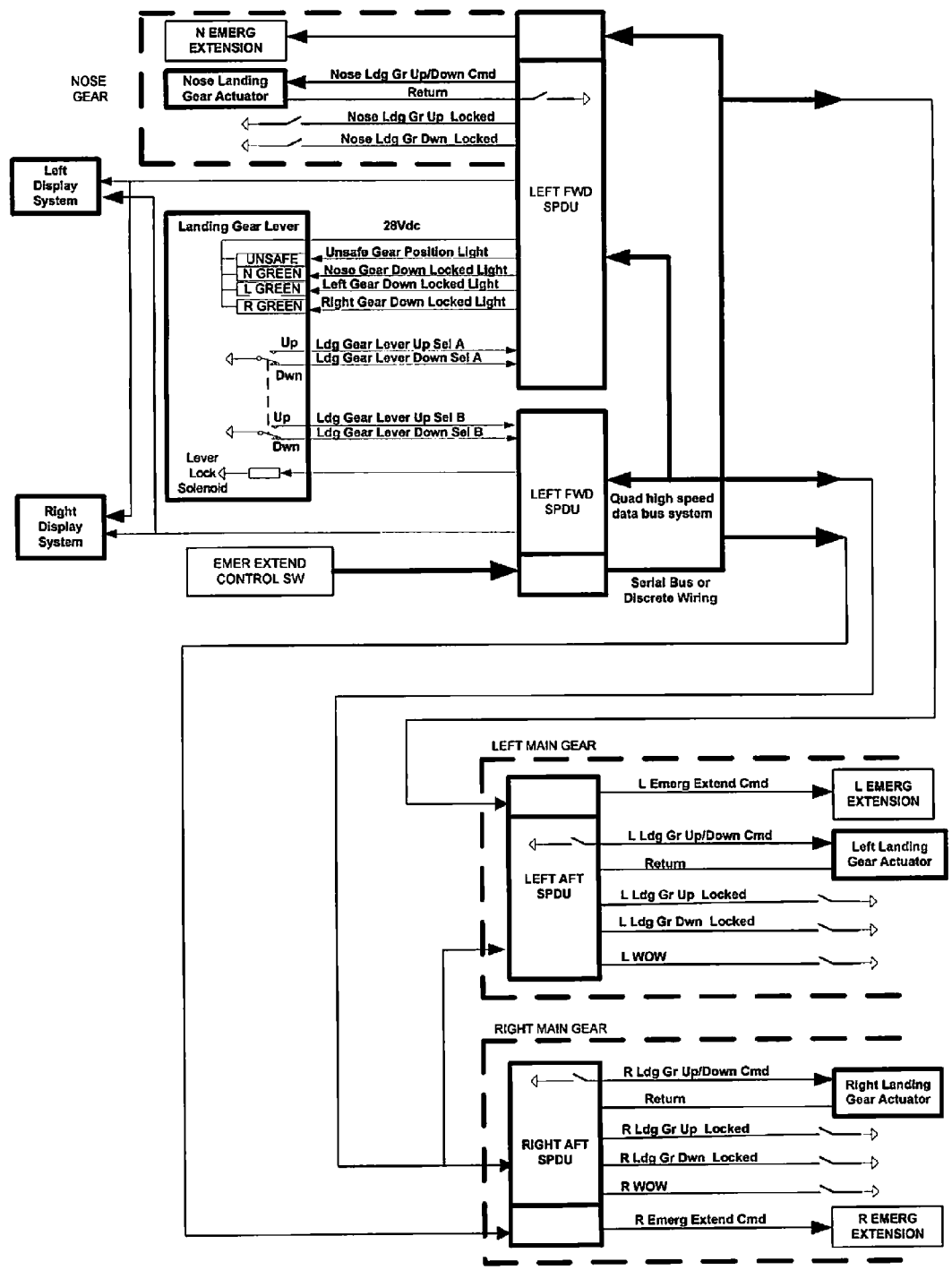
FIG. 17 is a block diagram of a landing gear system integrated utilities and power distribution system.

FIG. 17 is a block diagram of a landing gear system integrated utilities and power distribution system. A simplified wiring diagram for a typical landing gear system that has a main purpose of moving the landing gear to the position indicated by the cockpit landing gear lever is shown. The following paragraphs provide a description of the operation of a typical landing gear system.

The landing gear system is responsible for positioning the front, right main and left main landing gear, displaying the landing gear up/down and lock position status on the handle and display, detecting system conditions (failures, hazards, and maintenance conditions), adapting/responding to fault conditions, displaying landing gear CAS messages, and recording landing gear data (faults and trend monitoring).

The desired position of the landing gear is set by the crew using the landing gear lever. A pair of dual position switches located on the landing gear lever are used to signal the gear to the selected position. The landing gear handle includes a lock solenoid to protect against accidental retraction of the gears when the aircraft is on the ground. When the lever is moved to a position other than where the gear is at, the Integrated Utilities and power distribution system ("UPDS") is responsive and commands the actuators to move the landing gear to the indicated position. There are three electric actuators, one for the nose gear, and two for the main gear, right and left. When moving from up and locked or down and locked a pair of switches on each gear will indicate that it has left that position. A red light on the handle, when illuminated indicates that all the gear is neither in the up or down and locked positions. A set of 3 green lights (one for each gear) will indicate when each gear is in the down and locked position. Mechanical latches lock the motor/actuators in place when the gear are fully retracted or fully extended.

The display system displays the position of each landing gear on the display. If the landing gear surface position is indeterminate or failed, a red "X" appears in the location of the landing gear position.

An additional safety mechanism is a solenoid driven lock that locks to prevent inadvertent retraction of the landing gear when the aircraft is on the ground. A mutable aural warning alerts the crew if the landing gear is not in the down locked position when the aircraft is in an approach configuration at low altitude.

In the event of a hazardous condition or a detectable failure in the Landing Gear System, there are CAS messages to indicate the situation severity to the crew. The control and monitoring of the Landing Gear System is done through the Integrated Utilities and power distribution system and a wide range of faults and maintenance conditions can be detected. If safe operation of the landing gear is not possible, the Landing Gear System is responsive and removes power from the landing gear actuator motors.

Faults, CAS messages, as well as pertinent system data are stored in non-volatile memory. This data can be retrieved by ground personnel to assist in maintenance or repair of the aircraft.

A particular concern in the design of this system is how to satisfy the FHA requirements, and particularly those that are considered Hazardous or Catastrophic. The following are some assumptions regarding some of the landing gear FHA requirements for a typical landing gear system:

Un-commanded gear retraction is Hazardous (probability <10E-7 per flight hour).

Un-commanded gear extension is Major (probability <10E-5 per flight hour).

The first requirement dominates the design. To satisfy this requirement, protective mechanisms must be incorporated to prevent retraction of the gear due to failures. To meet the probability of 10E-7 per flight hour, these mechanisms (monitors) must reside in hardware that is independent from the hardware that performs the actuation of the landing gear system.

Therefore, the control and the monitor function are separated and hosted on different aircraft computing modules on dissimilar platforms within the host ACM The design must also consider failure latency. Failure latencies, especially on the monitor side of the system, are not normally detectable by the pilot. In the example, the return of the DC motors used to actuate the landing gear is switched during actuation by the monitor portion of the system to prevent the system from moving due to command path failures, such as unflagged processor failures, failed sensors, or shorted wires.

This switch can be failed stuck closed for some time undetected, and would not protect the system when failures occur. Therefore, to meet the safety requirements, a test must be incorporated to ensure that this switched return is not stuck in the ground position. Similarly other logic must be used to detect sensor failures, etc.

In conclusion, this system improves performance, safety, and maintainability because every signal in the system as well as the fault status of every monitor is available to the repair person via the maintenance interface making it much easier to troubleshoot and turn-around the aircraft.

With the addition of fault tolerance (meaning that the function is repeated in other aircraft computing modules), availability of this function is increased making it possible to defer maintenance while continuing to fly safely. Maintenance deferral will lower the maintenance cost of the aircraft.

In addition, an emergency extension system may be included. This system could be electric or mechanical. If the system is electric, the manual bypass can be used to accomplish the emergency extension in the event that main system is lost.

Flaps Example

Figure 18:
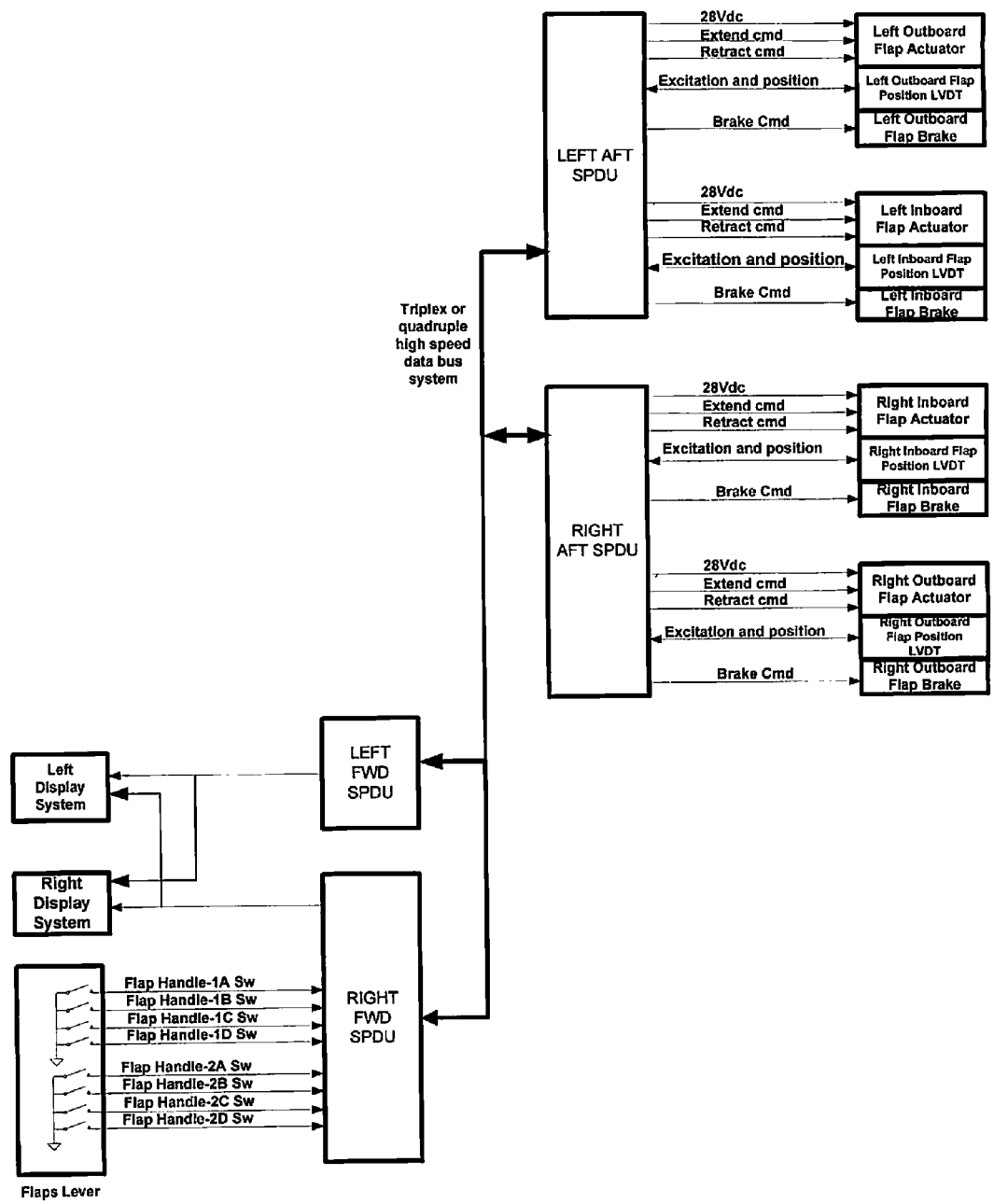
FIG. 18 is a block diagram of a flaps system integrated utilities and power distribution system implementation.

FIG. 18 is a block diagram of a flaps system integrated utilities and power distribution system implementation. A split flaps system consisting of four independently driven flaps surfaces: Left inboard flap, left outboard flap, right inboard flap, and the right outboard flap is shown. This flaps system is designed to support four flap positions in response to crew commands.

The flaps system is responsible for positioning the right and left flap surfaces, displaying the flaps position, detecting system conditions (failures, hazards, and maintenance conditions), adapting/responding to fault conditions, displaying flaps CAS messages, and recording flaps data (faults and trend monitoring).

As discussed earlier in the landing gear system section, safety considerations drive the implementation. The following are some of the typical hazards associate the flaps: uncommanded removal of lift augmentation in take-off, climb, approach, or landing is catastrophic (probability <10-9 per flight hour); and misleading flap position indication—flap not in commanded position in climb, cruise, or descent is catastrophic (probability <10-9 per flight hour).

To satisfy the first requirement, protective mechanisms must be incorporated to prevent retraction of the flaps due to failures. To meet the probability of 10-9 per flight hour, these mechanisms (monitors) must reside in hardware that is independent from the hardware that performs the actuation of the flaps system.

In this case, the brakes are the primary protective mechanisms. The brakes could fail undetected thus compromising the aircraft if a failure in the command path of the system is encountered. While the electronics of the system can be tested in a static manner, mechanical failure of the brake in the not applied position is not detectable.

To meet the catastrophic requirement, a preflight test is necessary to ensure that the brake is capable of protecting the system. A preflight mode test can attempt to move the flaps ½ or degree when the brake is applied. If the flaps move, then the brake is not applied and has failed.

Other functional management schemes are required to satisfy fault tolerance. The system includes logic that tracks the active resources and ensures that a hazardous function is operated by at least two independent aircraft computing modules: one hosting the control portion of the system, and the other hosting the monitor portion of the system.

In addition to improved safety, the flaps system in this example does not use any mechanical linking between the various flaps segments, which improves the availability and reduces the weight of the system.

Electric Actuation Interface Example

I/O modules can host the interface drivers of the electric motors. The I/O modules for motor actuations are fault tolerant and are designed to satisfy catastrophic integrity.

Sensors Interface Example

Figure 19:
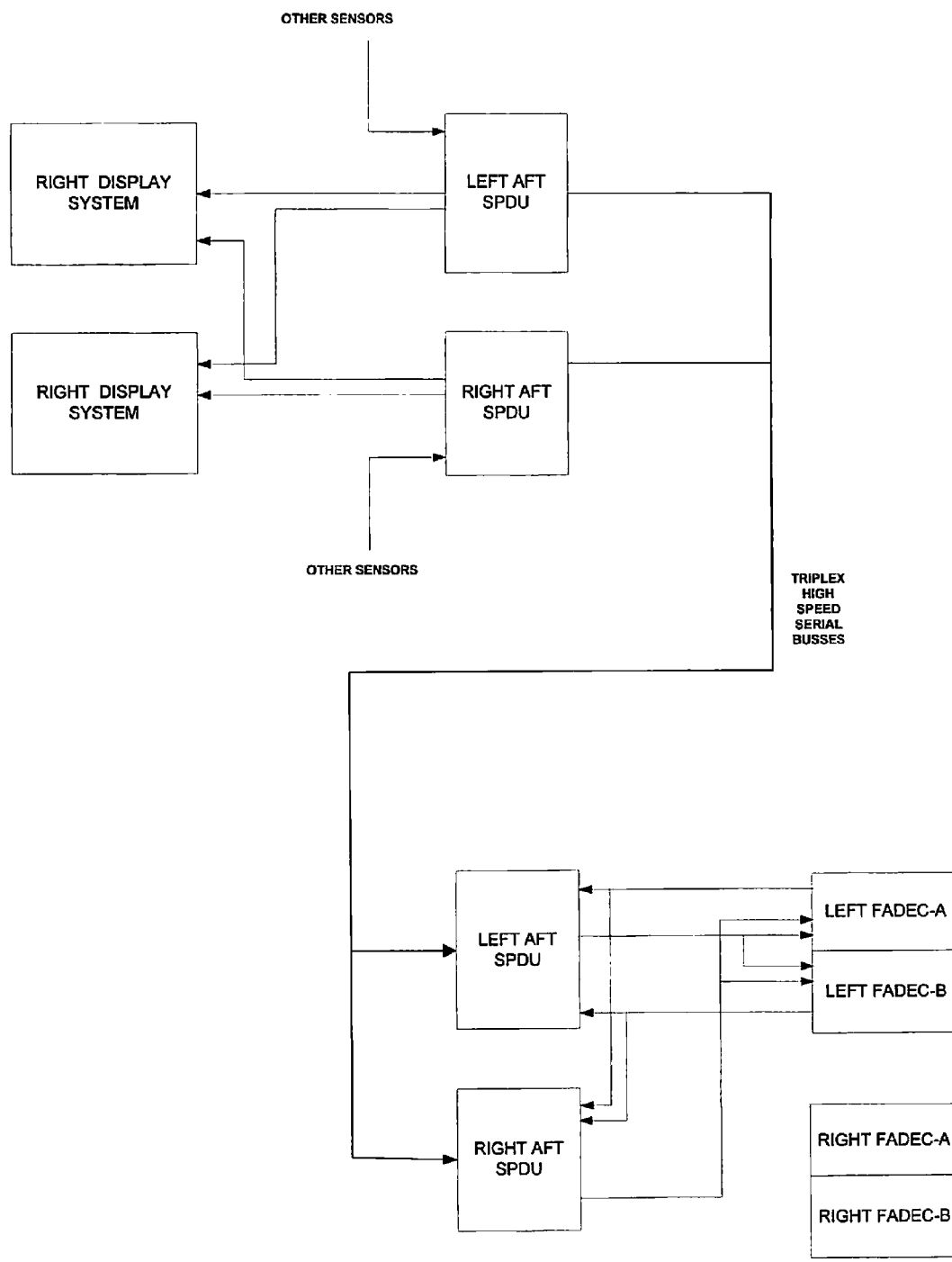
FIG. 19 is a block diagram of the engines and other sensor interfaces.

FIG. 19 is a block diagram of the engines and other sensor interfaces. Sensor interfaces, such as Airdata computers, attitude and heading reference systems ("AHRSs"), and full authority digital electronic control ("FADEC"), typically require exclusive ARINC 429 inputs (Aeronautical Radio Inc., of Annapolis, Md.) thus requiring additional Data Acquisition Unit(s) ("DAU") to sample the associated data and consolidate this data on a reduced number of A429 transmitters.

For an example in which there are 3 Airdata computers, 3 AHRSs, and 2 FADECs where each full authority digital engine controller ("FADEC") consists of 2 separate channels: the total number of A429 receivers required to support these sensors is at least 10, which is a problem for many display systems; therefore, a consolidation of this data on one or several busses may be necessary.

This data along with other aircraft systems data can be consolidated through the Integrated Utilities and PDS system ("UPDS") system without adding the cost and weight of data acquisition units ("DAUs"). The utilities and power distribution system in this case will ship this data along with the electrical and other subsystems data to the display system.

SUMMARY OF BENEFITS

The following provides a summary of the merits of the systems:

The system design is modular and can be easily customized to fit the specific needs of the system application. The provision for abundant I/O resources in the construction is also present. The design also allows a reduced line replaceable unit count, and an accompanying weight reduction.

Safety tends to be improved over that available in current systems. The system provides an electrical system design that allows any load in the system to receive power from any source in the aircraft treating every electrical load in the system as an "essential load" in a conventional aircraft. In addition, the electronic circuit breakers are designed such that no single point failure will compromise the operation of the associated electric load. Accordingly electrical power system availability tends to be increased, as well as reliability.

The system is also fault tolerant and is designed such that no single point failures compromise the functional performance on increased pilot workload Economic benefits may also be realized by the instant designs. Due to fault tolerance effectively the system consists of two systems combined into one. In addition the system is modular. Reduced warranty costs due to the reduced replacement rates during the warranty period are realized. Reduced spares inventory may be realized since many modules in the system are identical. Because of redundancy, reduced operational costs since many of the repairs can be deferred to when the aircraft is in periodic maintenance, thus reducing maintenance costs. Reduced development and acquisition costs from simplification may be had when utilities are combined with Power distribution Improved reliability: Since every load is effectively driven by at least two electronic circuit breaker circuits, under normal operating conditions the stress level on each electronic circuit breaker is cut in half, thus leading to improvements in the reliability of each electronic circuit breaker circuit.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. An aircraft utilities and DC power distribution system comprising:
   a primary power distribution unit coupled between a plurality of sources and two power feeders; and
   a secondary power distribution unit coupled to the primary power distribution unit through both of the two power feeders, and including:
   a power module;
   an I/O module; and
   a computing module
   whereby DC power from the plurality of sources may be applied to a plurality of aircraft power loads through the primary power distribution unit and the secondary power distribution unit.

2. The aircraft utilities and DC power distribution system of claim 1, further including current sensors coupled to each one of the two power feeders.

3. The aircraft utilities and DC power distribution system of claim 1, in which the plurality of sources includes a DC power generator.

4. The aircraft utilities and DC power distribution system of claim 1, in which the plurality of sources includes at least two DC power generators.

5. The aircraft utilities and DC power distribution system of claim 1, in which the plurality of sources includes a battery.

6. The aircraft utilities and DC power distribution system of claim 1, further comprising an additional secondary power distribution unit disposed in an aft section of an aircraft, and the secondary power distribution unit is disposed in a forward section of the aircraft.

7. An aircraft DC power management system comprising:
   at least one primary power distribution unit coupled to a plurality of power sources, and including a plurality of electronically activated contactors for coupling each of the plurality of power sources to an output of the primary power distribution unit, and at least one current sensing element disposed in a terminal lead of a contactor for determining a failure condition; and
   at least one secondary power distribution unit communicatively coupled to the at least one primary power distribution unit, and coupled to the output of the primary power distribution unit such that power from any one of the plurality of power sources may be coupled to an electrical load through the at least one primary power distribution unit and the at least one secondary power distribution unit under the direction of the at least one secondary power distribution unit.

8. The aircraft DC power management system of claim 7 in which the at least one secondary power distribution unit further includes:
   a power module;
   an I/O module; and
   a computing module communicatively coupled to the power module, the I/O module and the at least one primary power distribution unit so that power from any one of the plurality of power sources may be routed to the load based upon detection of a failure, an operators manual override or other conditions programmed into the computing module.

9. An aircraft DC power management system comprising:
   a first primary power distribution unit coupled to a first plurality of power sources, and including a first plurality of electronically activated contactors for coupling each of the first plurality of power sources to an output of the first primary power distribution unit, and at least one first current sensing element disposed in a terminal lead of a first contactor for determining a current output condition;
   a second primary power distribution unit coupled to a second plurality of power sources, and including a second plurality of electronically activated contactors for coupling each of the second plurality of power sources to an output of the second primary power distribution unit, and at least one second current sensing element disposed in a terminal lead of a second contactor for determining a failure condition; and
   at least one secondary power distribution unit communicatively coupled to the first primary power distribution unit and to the second primary power distribution unit, and coupled to the output of the first and second primary power distribution unit such that power from any one of the first or second plurality of power sources may be coupled to an electrical load through one of the first or second primary power distribution unit and the at least one secondary power distribution unit under the direction of the at least one secondary power distribution unit.

10. The aircraft DC power management system of claim 9 in which the at least one secondary power distribution unit further includes:
    a power module;
    an I/O module; and
    a computing module communicatively coupled to the power module, the I/O module, the first primary power distribution unit and the second primary power distribution unit so that power from any one of the first or second plurality of power sources may be routed to the load based upon detection of a failure, an operating condition, an operators manual override or other conditions programmed into the computing module.

11. The aircraft DC power management system of claim 10 wherein the power module, I/O module and computing module are interconnected via at least one serial digital bus.

12. The aircraft DC power management system of claim 11 wherein the at least one serial digital bus comprises three independent serial digital busses.

13. The aircraft DC power management system of claim 9 wherein the first primary power distribution unit has one output and the second primary power distribution unit has one output.

14. The aircraft DC power management system of claim 13 further comprises a standby battery coupled to both the output from the first primary power distribution unit and the output from the second primary power distribution unit.

15. The aircraft DC power management system of claim 9 wherein the first primary power distribution unit has a first power line output and a second power line output, the second primary power distribution unit has a first power line output and a second power line output.

16. The aircraft DC power management system of claim 15 wherein the at least one secondary power distribution unit comprises a first plurality of secondary power distribution units and a second plurality of secondary power distribution units, the first plurality of secondary power distribution units couples to both the first power line output from the first primary power distribution unit and the second power line output from the second primary power distribution unit, the second plurality of secondary power distribution units couples to both the second power line output from the first primary power distribution unit and the first power line output from the second primary power distribution unit.

17. The aircraft DC power management system of claim 15 further comprises a standby battery coupled to both the first power line output from the first primary power distribution unit and the first power line output from the second primary power distribution unit.

18. The aircraft DC power management system of claim 9 wherein the first primary power distribution unit and the second primary power distribution unit are coupled via a bus tie.

19. The aircraft DC power management system of claim 9 wherein the at least one secondary power distribution unit comprises internal fuses to prevent common mode failures within the secondary power distribution units from causing catastrophic failure of the entire aircraft DC power management system.

20. The aircraft DC power management system of claim 9 wherein the at least one secondary power distribution unit comprises internal filters to suppress interfering signals.

21. The aircraft DC power management system of claim 9 wherein both the first primary power distribution unit and the second primary power distribution unit comprise a manual controller, the manual controller being normally inactive but having ability to control any contactors within the first or the second primary power unit.

\* \* \* \* \*